US010050274B2

(12) United States Patent
Hojo et al.

(10) Patent No.: US 10,050,274 B2
(45) Date of Patent: Aug. 14, 2018

(54) POWER STORAGE DEVICE

(75) Inventors: Nobuhiko Hojo, Osaka (JP); Yu Ohtsuka, Osaka (JP); Taisuke Yamamoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2995 days.

(21) Appl. No.: 12/300,603

(22) PCT Filed: May 11, 2007

(86) PCT No.: PCT/JP2007/059771
§ 371 (c)(1),
(2), (4) Date: Nov. 12, 2008

(87) PCT Pub. No.: WO2007/132786
PCT Pub. Date: Nov. 22, 2007

(65) Prior Publication Data
US 2009/0111030 A1   Apr. 30, 2009

(30) Foreign Application Priority Data

May 12, 2006 (JP) ................................. 2006-133733
May 12, 2006 (JP) ................................. 2006-133734
Sep. 22, 2006 (JP) ................................. 2006-257812

(51) Int. Cl.
*H01M 6/16*    (2006.01)
*H01M 4/60*    (2006.01)
(Continued)

(52) U.S. Cl.
CPC .............. *H01M 4/60* (2013.01); *H01M 4/13* (2013.01); *H01M 10/0564* (2013.01); *Y02E 60/122* (2013.01)

(58) Field of Classification Search
None
See application file for complete search history.

(56) References Cited

U.S. PATENT DOCUMENTS

| 5,770,333 A | 6/1998 | Saito et al. | |
| 6,074,785 A * | 6/2000 | Dansui | H01M 4/52 |
| | | | 429/223 |

(Continued)

FOREIGN PATENT DOCUMENTS

| EP | 1416553 A1 | 5/2004 |
| JP | 60-014762 | 1/1985 |

(Continued)

OTHER PUBLICATIONS

Extended European Search Report issued in European Patent Application No. 07743206.0 dated Sep. 12, 2012.

(Continued)

*Primary Examiner* — Barbara L Gilliam
*Assistant Examiner* — Adam A Arciero
(74) *Attorney, Agent, or Firm* — McDermott Will & Emery LLP

(57) ABSTRACT

A power storage device of the present invention includes a positive electrode, a negative electrode, and an electrolyte. At least one of the positive electrode and the negative electrode includes an organic compound as an active material having a portion contributing to an oxidation-reduction reaction. The organic compound is crystalline in both a charged state and a discharged state.

18 Claims, 9 Drawing Sheets

(51) Int. Cl.
*H01M 6/14* (2006.01)
*H02J 7/00* (2006.01)
*H01M 4/13* (2010.01)
*H01M 10/0564* (2010.01)

(56) References Cited

U.S. PATENT DOCUMENTS

| | | | |
|---|---|---|---|
| 2002/0102460 | A1 | 8/2002 | Nakai et al. |
| 2004/0045818 | A1* | 3/2004 | Inatomi et al. ............... 204/291 |
| 2004/0214082 | A1* | 10/2004 | Inatomi et al. ............... 429/213 |
| 2004/0234856 | A1* | 11/2004 | Morigaki ................ H01M 4/13 429/231.1 |
| 2005/0100790 | A1* | 5/2005 | Ota .................... H01M 4/0402 429/231.95 |
| 2006/0134521 | A1* | 6/2006 | Shima ................. C01G 55/002 429/231.1 |
| 2006/0134527 | A1* | 6/2006 | Amine et al. ................ 429/326 |

FOREIGN PATENT DOCUMENTS

| | | |
|---|---|---|
| JP | H 9-63651 | 3/1997 |
| JP | 2002-157995 A | 5/2002 |
| JP | 2002-231244 | 8/2002 |
| JP | 2004-111374 | 4/2004 |
| JP | 2004-259618 | 9/2004 |
| JP | 2004-342605 | 12/2004 |
| JP | 2006-324179 | 11/2006 |
| JP | 2007-242386 | 9/2007 |
| WO | WO-2005/017953 A2 | 2/2005 |

OTHER PUBLICATIONS

Ue "Mobility and Ionic Association of Lithium and Quarternary Ammonium Salts in Propylene Carbonate and y-Butyrolactone" p. 3336-3342 Journal Electrochem. Society, vol. 141, No. 12 Dec. 1994.

Misaki et al "Synthesis and Properties of Higher Homologues of Bis-fused TTF" p. 337-344 Mol. Cryst.Liq.Chryst. vol. 284 1996 Overseas Publishers Association, Amsterdam B.V., The Netherlands.

Misaki et al "2,5-Bis(1',3'-dithiol-2'-ylidene)-1,3,4,6,-ttrathiapentalene and Its Related Unsymmetrical Donors" p. 1337-1340 Chemistry Letters The Chemical Society of Japan 1993.

Suzuki et al "Bis(ethylenedioxy) tetrathiafulvalene: The First Oxygen-Substituted Tetrathiafulvalene" p. 3108-3109 Journal of American Chemical Society vol. 111 1989.

Senga et al "Peculiarity of Ethylenedioxy Group in Formation of Conductive Charge-Transfer Complexes of Bis(Ethylene-dioxy)-Dibenzotetrathiafulvalene (Bedo-DBTTF)" p. 97-143 Mol. Cryst. Liq.Chryst. vol. 296 1997 Overseas Publishers Association, Amsterdam B.V., The Netherlands.

Japanese Office Action, with English Translation, issued in Japanese Patent Application No. JP 2007-541524 dated Apr. 3, 2008.

* cited by examiner

[FIG. 1]
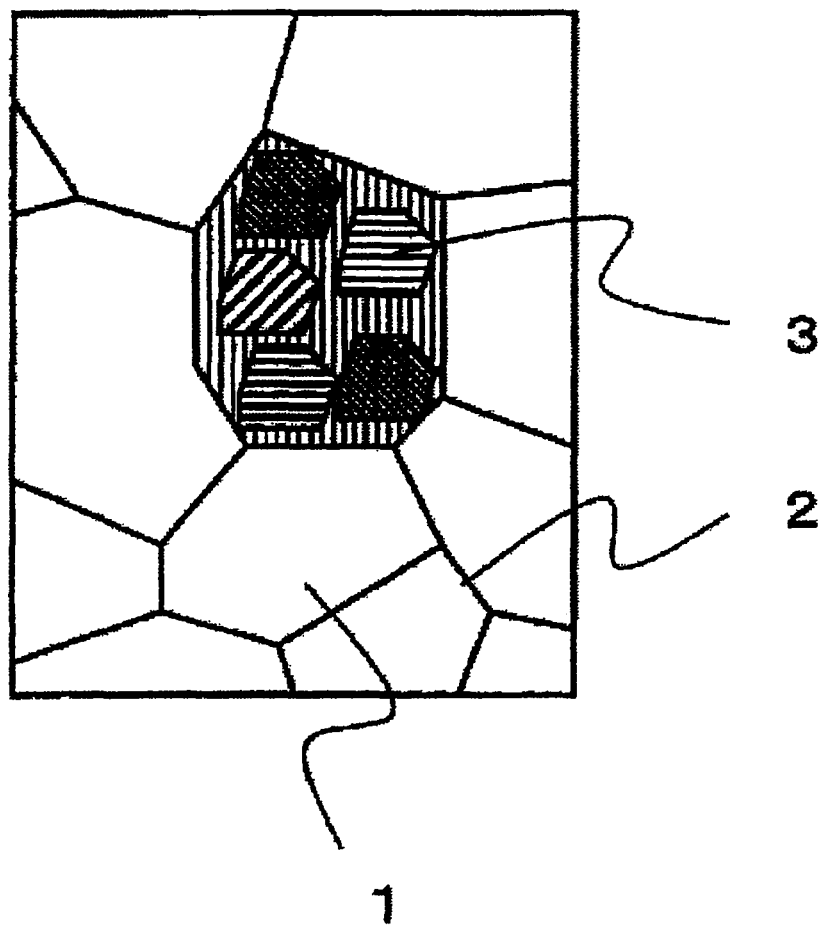
[FIG. 2]

[FIG. 3]
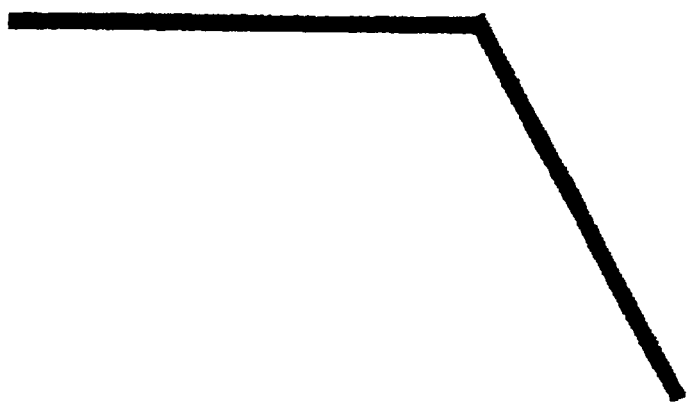
[FIG. 4]
[FIG. 5]

[FIG. 6]
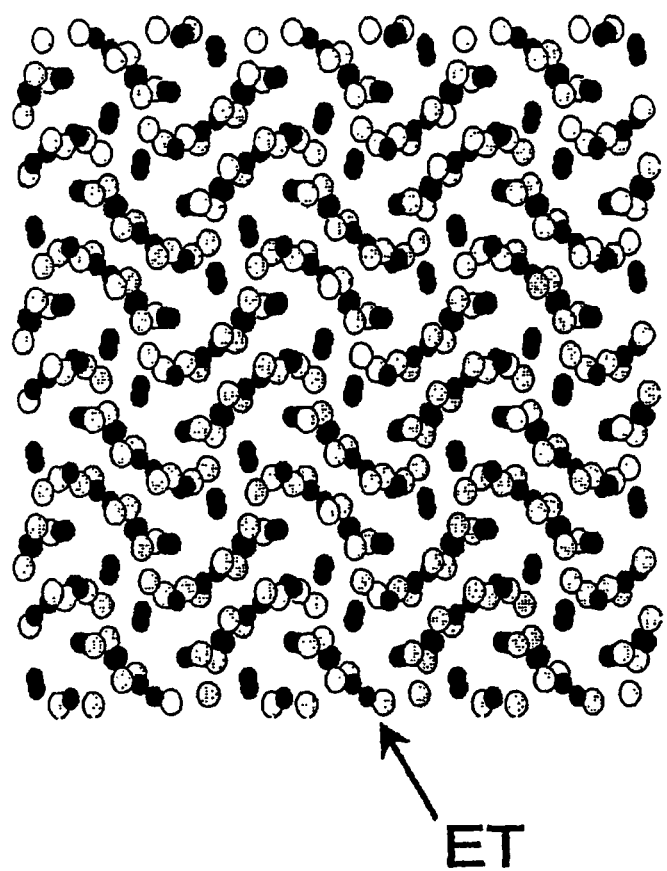

[FIG. 7]
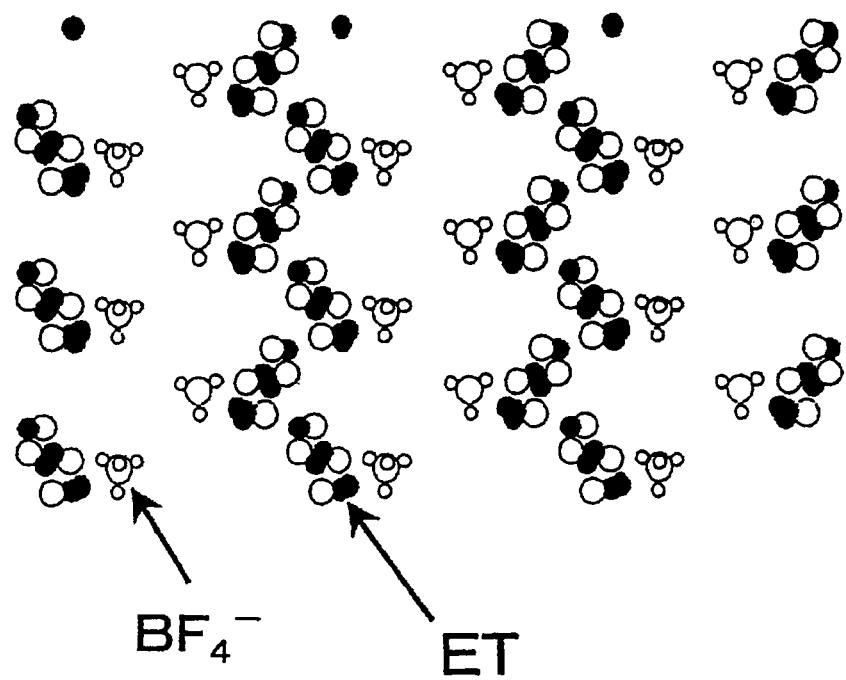

[FIG. 8]
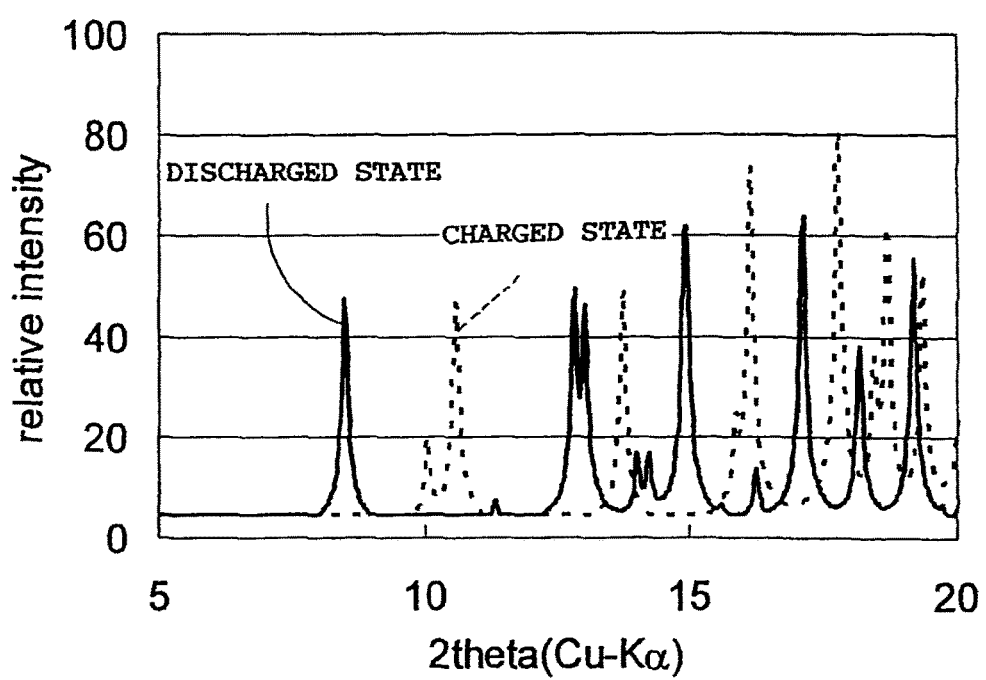

[FIG. 9]
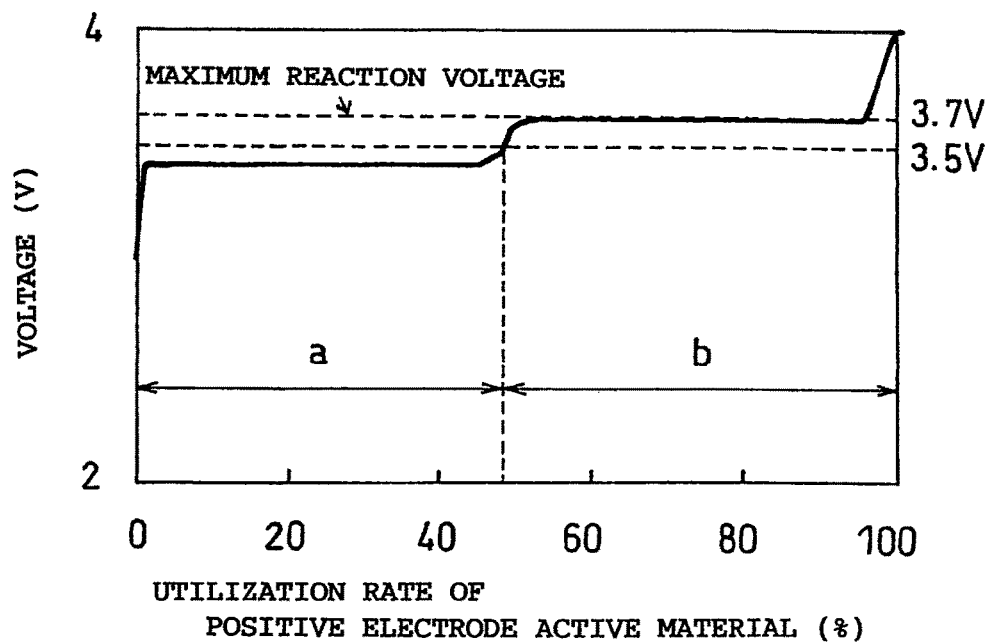
[FIG. 10]
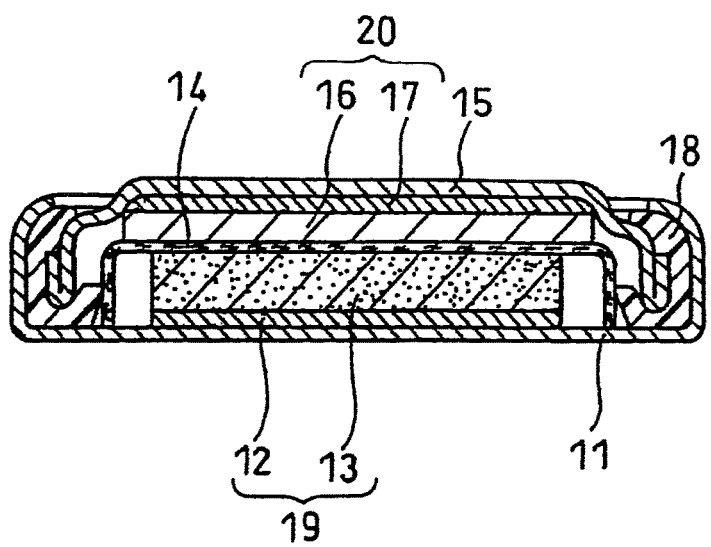

[FIG. 11]
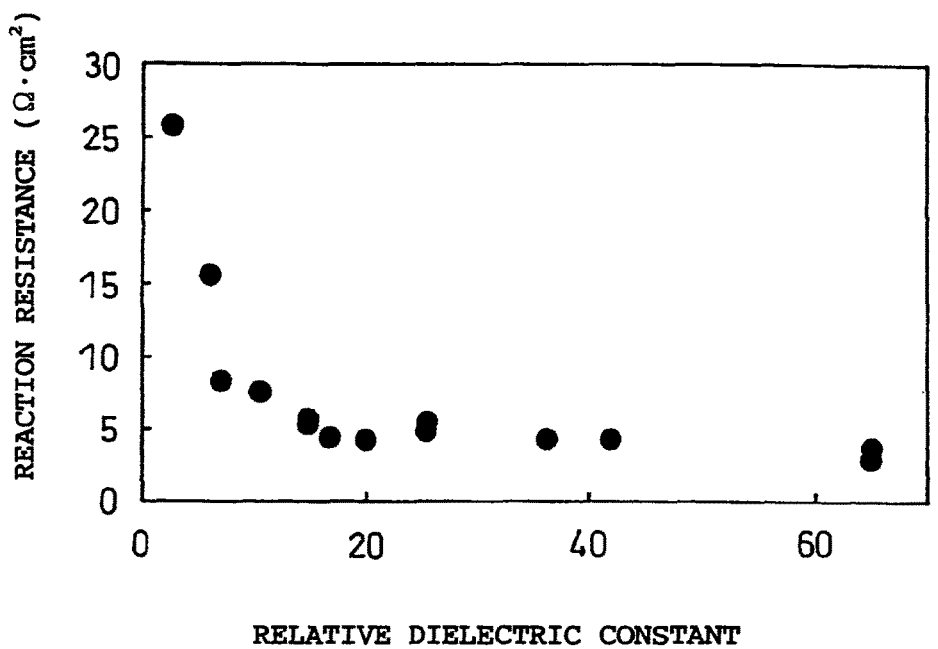
[FIG. 12]
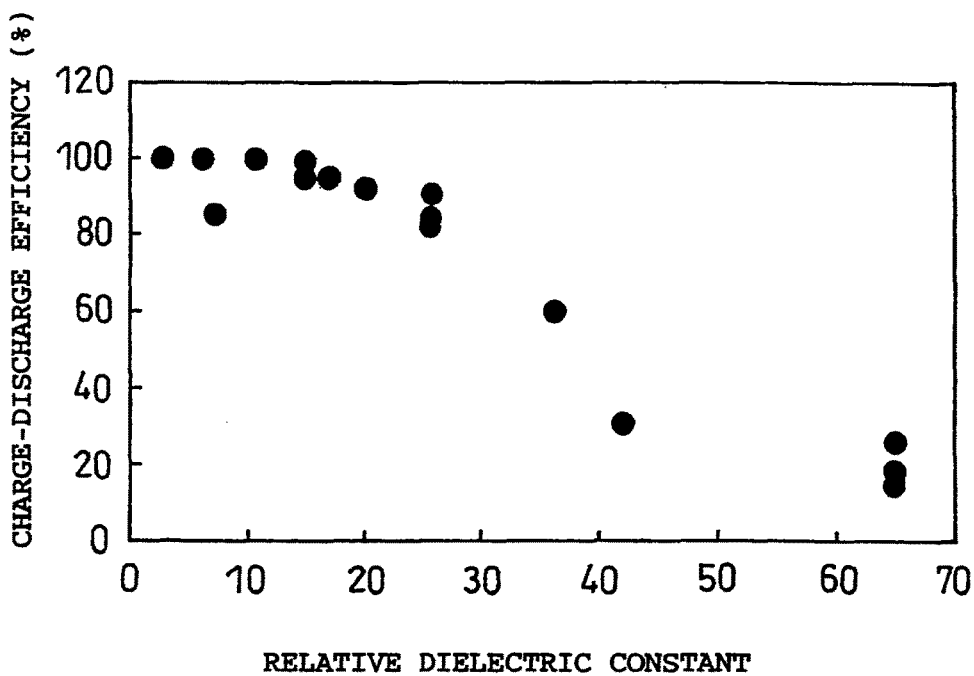

[FIG. 13]
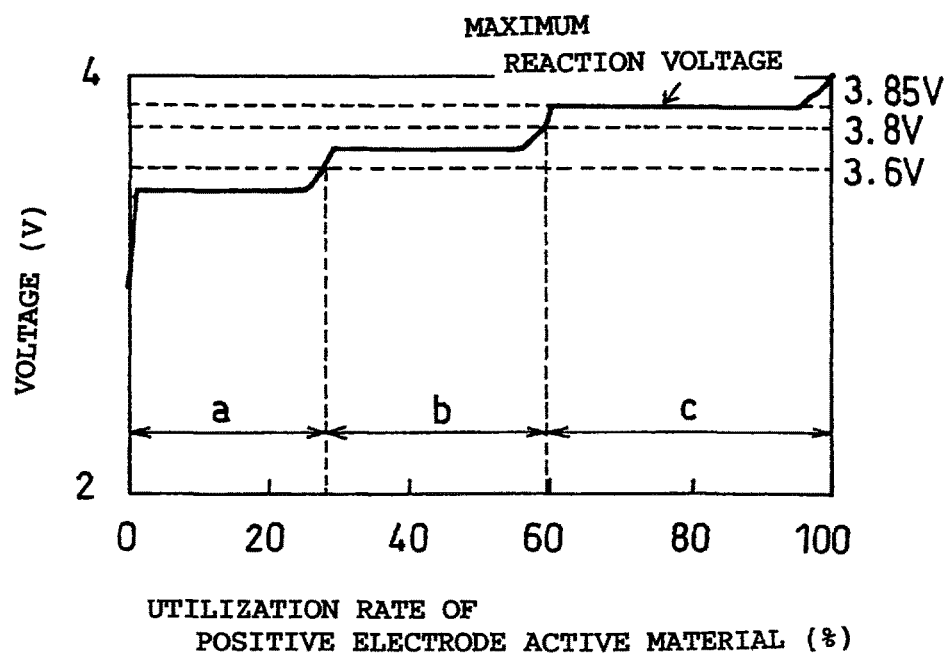

[FIG. 14]
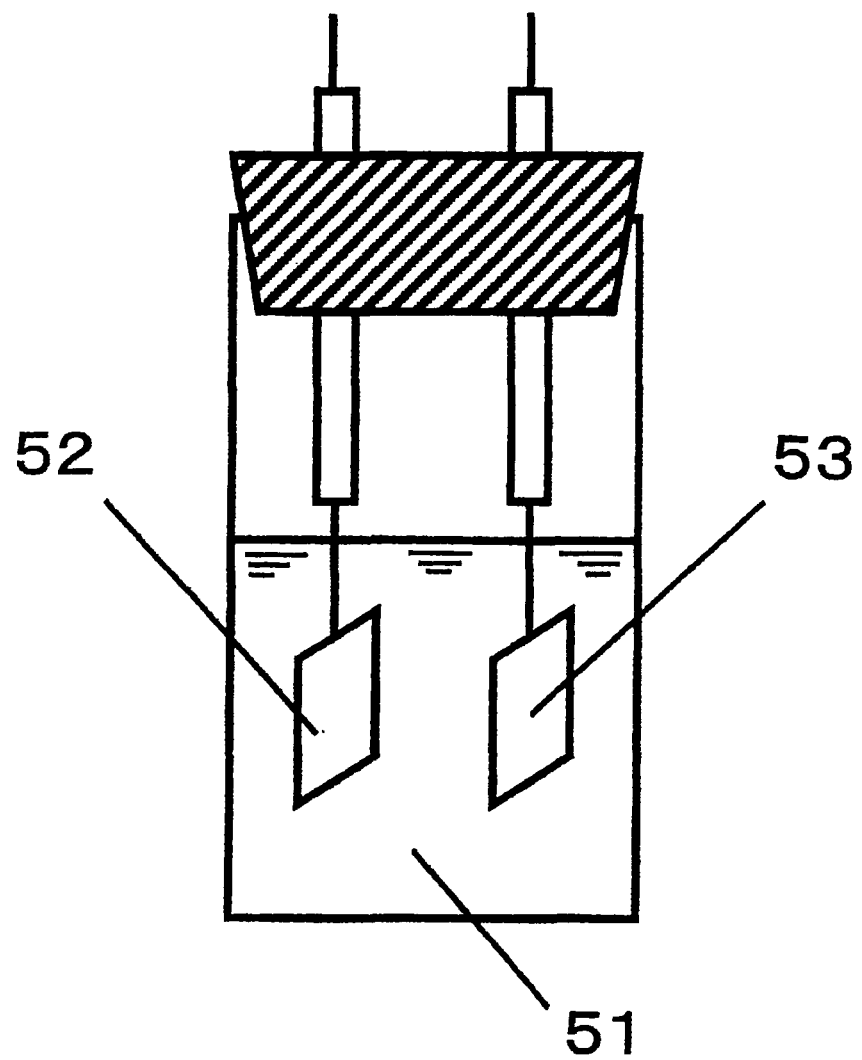

POWER STORAGE DEVICE

RELATED APPLICATIONS

This application is the US National Phase under 35 U.S.C. § 371 of International Application No. PCT/JP2007/059771 filed on May 11, 2007, which claims the benefit of Japanese Application Nos. JP2006-133733, and JP 2006-133734, filed on May 12, 2008 and JP 2006-257812 filed on Sep. 22, 2006 the disclosures of which Applications are incorporated by reference herein.

TECHNICAL FIELD

The present invention relates to a power storage device having a high output power and a high capacity and being excellent in charge-discharge cycle characteristics.

BACKGROUND ART

With the recent proliferation of hybrid automobiles that can run on both energies of gasoline and electricity, uninterrupted power supplies, mobile communication devices, portable electronic devices, and the like, the requirement for improving the performance of chargeable and dischargeable power storage devices has been greatly increased. Specifically, there are requirements for a high output power, a high capacity, and improvement in charge-discharge cycle characteristics.

For example, Patent Documents 1 and 2 propose, with the purpose of achieving a high output power and a high capacity, a power storage device in which a positive electrode including an organic compound having a conjugated π-electron cloud as an electrode active material and a negative electrode as conventionally used for lithium batteries are used in combination.

In the power storage device in which an organic compound with low molecular weight is used as an electrode active material, however, the electric capacity may be reduced with repeated charging and discharging. This is presumably because the molecules of the organic compound serving as the active material are partially dissolved into an electrolyte from the electrode as charging and discharging are repeated, and separated from the interior of the electrode, and the separated active material cannot contribute to the charge-discharge reaction.

Patent Document 3 proposes using in a battery in which an electrically conductive organic complex formed of a positively or negatively charged organic compound and an ion contained in an electrolyte having a polarity opposite to the polarity of the organic compound is used as an electrode active material, an electron donative or electron receptive organic compound as used for electrocrystallization (electrochemical crystal growth method), as the organic compound constituting the conductive organic complex.

The electrocrystallization (electrochemical crystal growth method) is a method in which two electrodes are introduced in a solvent prepared by dissolving the organic compound and a supporting salt for the electrolyte, and voltage is applied across the two electrodes, thereby to cause an oxidation or reduction reaction on one of the electrodes, so that oxidant crystals or reductant crystals are formed. Patent Document 3 further discloses a perylene perchlorate complex, a tetrathianaphthalene perchlorate complex, and the like as the examples of the conductive organic complex, and using these as an electrode active material.

The use of a perylene perchlorate complex as an electrode active material is described with reference to FIG. 14. FIG. 14 is a schematic diagram of a battery in which a perylene perchlorate complex is used as an electrode active material. The battery has an electrolyte 51 prepared by dissolving lithium perchlorate serving as a supporting salt in tetrahydrofuran serving as a solvent, a positive electrode 52 being a platinum electrode, a negative electrode 53 made of metallic lithium. The electrolyte 51 further includes perylene serving as a positive electrode active material. In charging, the perylene dissolved in the electrolyte is oxidized on the positive electrode 52, whereby a perylene perchlorate complex (solid) is produced. In discharging, the perylene perchlorate complex (solid) precipitated on the positive electrode 52 is reduced to be perylene and dissolved in the electrolyte. Here, the reaction that occurs on the negative electrode 53 is a dissolution-deposition reaction of metallic lithium.

As such, in the foregoing battery, the active material is dissolved in the electrolyte in discharging, and therefore the following three serious problems arise when the active material is actually used in a secondary battery.

First, the battery reaction occurs on the surfaces of the electrodes. Since the positive electrode active material in the foregoing battery is dissolved and dispersed in the electrolyte, the positive electrode active material present away from the surfaces of the electrodes is not utilized for the battery reaction. This means that the ratio of the perylene that can contribute to the charge-discharge reaction to the whole perylene dissolved in the electrolyte is small, and as a result, the capacity density as a power storage device is significantly reduced.

Secondary, as in the case of the foregoing battery, when the battery reaction involves dissolution and deposition of an active material, a secondary battery having excellent charge-discharge cycle characteristics is extremely difficult to obtain. A needle-like deposit called dendrite is formed and grown during the deposition, and as charging and discharging are repeated, the grown needle-like deposit may be broken and separated from the electrode plate, and thus can no more be used for charging and discharging. Alternatively, the needle-like deposit may be grown on one of the electrodes until it reaches the other one of the electrodes, causing the positive electrode and the negative electrode to be short-circuited. As a result, the battery may fail to operate normally.

These phenomena are well known in non-aqueous batteries including a metallic lithium electrode, the battery reaction mechanism of which involves dissolution and deposition.

Thirdly, the organic compound capable of being oxidized and reduced, such as perylene, is dissolved in the electrolyte and brought in contact with both the positive electrode and the negative electrode, causing the positive electrode and the negative electrode to be short-circuited. Once the positive electrode and the negative electrode are short-circuited, self-discharge proceeds during the storage of the battery, and thus the amount of charged electricity of the battery is reduced.

As described above, although the use of the conductive organic complex formed of the cation or anion of the organic compound and the anion or cation of the supporting salt in the electrolyte as an electrode active material has been disclosed, it has been difficult to simultaneously achieve both a high capacity and improvement in charge-discharge cycle characteristics in secondary batteries.

Patent Document 1: Japanese Laid-Open Patent Publication No. 2004-111374
Patent Document 2: Japanese Laid-Open Patent Publication No. 2004-342605
Patent Document 3: Japanese Laid-Open Patent Publication No. Sho 60-14762

DISCLOSURE OF THE INVENTION

Problem To be Solved by the Invention

In view of the above, in order to solve the foregoing conventional problems, the present invention intends to provide a power storage device having a high capacity and a high output power and being excellent in charge-discharge cycle characteristics.

Means for Solving the Problem

With regard to power storage devices, the crystalline quality of an organic compound serving as an active material and the correlation between the crystalline quality of the organic compound serving as an active material and the power storage device characteristics are still unexamined. Under these circumstances, the present inventors have conducted intensive studies and consequently found that in a power storage device including an organic compound capable of being oxidized and reduced as an electrode active material, a correlation is established between the crystalline quality of the organic compound during charging and discharging and the charge-discharge cycle characteristics of the power storage device. Specifically, when the organic compound is crystalline during both charging and discharging, the charge-discharge characteristics are good; and when the organic compound is not crystalline during at least one of charging and discharging, the charge-discharge characteristics of the power storage device are deteriorated. This is presumably because if the organic compound serving as an active material is crystalline during both charging and discharging, the dissolution of the organic compound in the electrolyte is inhibited.

Specifically, the present invention is a power storage device including a positive electrode, a negative electrode, and an electrolyte, wherein at least one of the positive electrode and the negative electrode includes an organic compound as an active material having a portion contributing to an oxidation-reduction reaction, and the organic compound is crystalline in both a charged state and a discharged state.

It is preferable that in at least one of a charged state and a discharged state, the organic compound included in at least one of the positive electrode and the negative electrode is positively or negatively charged, and the positively or negatively charged organic compound forms a crystalline salt with an ion contained in the electrolyte, the ion having a polarity opposite to the polarity of the organic compound.

EFFECT OF THE INVENTION

According to the present invention, it is possible to provide a power storage device having a high capacity and a high output power and being excellent in charge-discharge cycle characteristics.

BRIEF DESCRIPTION OF THE DRAWINGS

FIG. 1 is a conceptual diagram showing a crystal grain of an active material.

FIG. 2 is a schematic diagram of a molecular structure of an organic compound having a single-planar structure.

FIG. 3 is a schematic diagram of a molecular structure of an organic compound having a multi-planar structure.

FIG. 4 is a schematic diagram of a molecular structure of another organic compound having a multi-planar structure.

FIG. 5 is a schematic diagram of a molecular structure of still another organic compound having a multi-planar structure.

FIG. 6 is a diagram showing a crystal structure of the molecules of an active material during discharging.

FIG. 7 is a diagram showing a crystal structure of the molecules of the active material during charging.

FIG. 8 is an X-ray diffraction pattern of the active material under charging and discharging.

FIG. 9 is a charge voltage curve obtained when tetrathiafulvalene is used as a positive electrode active material.

FIG. 10 is a schematic longitudinal cross sectional diagram of a coin battery, which is as an example of the power storage device of the present invention.

FIG. 11 is a graph showing a relationship between the reaction resistance and the relative dielectric constant in a test cell.

FIG. 12 is a graph showing a relationship between the charge-discharge efficiency and the relative dielectric constant in the test cell.

FIG. 13 is a charge voltage curve obtained when bis(ethylenedithio)tetrathiafulvalene is used for a positive electrode active material.

FIG. 14 is a schematic diagram showing a structure of a conventional battery.

BEST MODE FOR CARRYING OUT THE INVENTION

The present invention relates to a power storage device including a positive electrode, a negative electrode, and an electrolyte, wherein at least one of the positive electrode and the negative electrode includes an organic compound as an active material having a portion contributing to an oxidation-reduction reaction, and the organic compound is crystalline in both a charged state and a discharged state.

As such, a power storage device having a high capacity and a high output power and being excellent in charge-discharge cycle characteristics can be provided. The present invention is particularly effective with respect to an organic compound having a low molecular weight of 10,000 or lower, the organic compound being easily dissolved in the electrolyte.

The relationship between the crystalline quality of the organic compound and the power storage device characteristics is described below.

There has been found that a change in the molecular structure of an organic compound serving as an active material causes a change in the power storage device characteristics such as the capacity and the voltage. In relation to this finding, the present inventors have found that, in addition to the above, even when there is no change in the molecular structure of an organic compound, if there is a change in the crystalline quality of the organic compound, the power storage device characteristics are significantly changed. Specifically, when the organic compound serving as an active material is crystalline in both a charged state and a discharged state, a power storage device excellent in charge-discharge cycle characteristics can be provided; and conversely, when the organic compound serving as an active material is not crystalline in at least one of a charged state and a discharged state, the charge-discharge characteristics of the power storage device are drastically deteriorated.

The relationship between the crystalline quality of the organic compound and the charge-discharge characteristics of the power storage device as described above can be explained as follows.

When the organic compound serving as an active material is not crystalline, that is, the organic compound is amorphous, or alternatively when the organic compound has no specific periodic crystal structure, the electrolyte readily enters the space between the molecules of the organic compound, increasing the contact area at the molecular level between the organic compound and the electrolyte. This consequently increases the solubility of the organic compound in the electrolyte. In contrast, when the organic compound serving as an active material is crystalline, the molecules of the organic compound are closely packed with each other, making it difficult for the electrolyte to enter the space between the molecules of the organic compound. As a result, the contact area at the molecular level between the organic compound and the electrolyte is decreased. This significantly reduces the solubility of the organic compound in the electrolyte, resulting in improvement in charge-discharge cycle characteristics of the power storage device.

The crystalline quality of a sample (an active material) is classified according to the size of its crystallite. Here, the crystallite means a primary crystal, namely, a minimum unit having a plurality of which are oriented in the same direction to form a crystal. The crystallite is described with reference to FIG. 1. FIG. 1 is a conceptual diagram showing a crystal grain of a compound used as a sample. As shown in FIG. 1, the sample is formed of an aggregate of a plurality of particles 1, and a grain boundary 2 which is an interface between the particles 1. Each particle 1 is composed of an aggregate of a plurality of crystallites 3. In other words, the crystallite means each crystallite 3 constituting one particle 1 rather than each particle 1 formed of an aggregate of the crystallites 3. It should be noted that only when the particle 1 is composed not of a plurality of the crystallites 3 but of one crystallite 3, the particle itself is referred to as the crystallite. The larger the crystallite size is, the higher the crystalline quality is.

Further, when the sample is formed of particles each composed of single crystallite 3 alone, the sample is referred to as a single crystal sample; and when the sample is formed of particles each composed of two or more crystallites 3, the sample is referred to as a polycrystalline sample. When the size of the crystallite 3 is as small as from several nm to ten several nm, the sample is generally referred to as a microcrystalline sample. In these cases, the sample is regarded as being crystalline.

In contrast, when the size of the crystallite 3 is several nm or less, or alternatively no crystallite is observed, the sample is generally referred to as an amorphous sample. In these cases, the sample is regarded as being not crystalline.

Next, the relationship between the crystalline quality and the X-ray diffractometry of the sample is described.

The crystallite size and the half width of a diffraction peak in X-ray diffractometry of the sample satisfy the following formula (a) (Scherrer's formula).

$$D = K \times \lambda / (\beta \cdot \cos \theta) \qquad (a)$$

where D is a crystallite size (nm), K is a constant, $\lambda$ is an X-ray wavelength (nm), and $\beta$ is a half width of a diffraction peak (rad).

When the sample has high crystalline quality, namely, a large crystallite size, the half width of a diffraction peak is small, that is, a sharp diffraction peak is observed. When the sample has low crystalline quality, namely, a small crystallite, the half width of a diffraction peak is large, that is, a so-called broad diffraction peak is observed. When the crystallite of the sample is extremely small, no diffraction peak appears and a halo pattern is observed. This state is referred to as being "amorphous in terms of X-ray diffraction". In this state, the half width is, for example, approximately 2 to 3° or more than that.

As described above, whether the sample is crystalline or not is judged from whether the diffraction line of the sample obtained by X-ray diffractometry has a diffraction peak or not.

Examples of the factor affecting the crystalline quality of the active material during charging and discharging include, for example, the molecular structure of the active material, the components of the electrolyte such as the anion and the solvent, and the number of reaction electrons per one molecule of the active material involved in a charge-discharge reaction. These factors are described below one by one.

(A) Molecular Structure of Active Material

Examples of the organic compound having a portion contributing to an oxidation-reduction reaction (a charge-discharge reaction) as an active material in the power storage device of the present invention include an organic compound having a conjugated $\pi$-electron cloud (hereinafter referred to as a $\pi$-electron compound) and an organic compound having a radical (hereinafter referred to as a radical compound).

When the $\pi$-electron compound or the radical compound is used as the active material, the oxidation-reduction reaction involves no physical or chemical structural change of the active material and proceeds through the electron transfer dependent on $\pi$-electron or radical. Because of this, the reaction proceeds very quickly, and therefore, the reaction resistance during charging and discharging is reduced, resulting in improvement in output power characteristics of the power storage device.

The $\pi$-electron compound is exemplified by, for example, organic compounds having a structure represented by the general formula (1) or (2) as shown below.

General formula (1):

[Chemical formula 1]

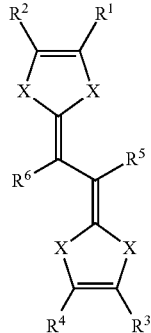

(1)

In the general formula (1), X is a sulfur atom or an oxygen atom; $R^1$ to $R^4$ are independently selected from a hydrogen atom, a chain aliphatic group, a cyclic aliphatic group, a hydroxyl group, a cyano group, an amino group, a nitro group, and a nitroso group; $R^5$ and $R^6$ are independently selected from a hydrogen atom, a chain aliphatic group, and a cyclic aliphatic group; and the chain or cyclic aliphatic group can include at least one selected from the group consisting of an oxygen atom, a nitrogen atom, a sulfur atom, a silicon atom, a phosphorus atom, a boron atom, and a halogen atom.

General formula (2):

[Chemical formula 2]

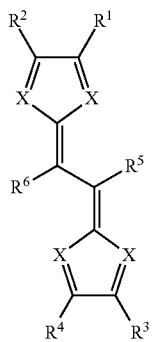

(2)

In the general formula (2), X is a nitrogen atom; $R^1$ to $R^4$ are independently selected from a hydrogen atom, a chain aliphatic group, a cyclic aliphatic group, a hydroxyl group, a cyano group, an amino group, a nitro group, and a nitroso group; $R^5$ and $R^6$ are independently selected from a hydrogen atom, a chain aliphatic group, and a cyclic aliphatic group; and the chain or cyclic aliphatic group can include at least one selected from the group consisting of an oxygen atom, a nitrogen atom, a sulfur atom, a silicon atom, a phosphorus atom, a boron atom, and a halogen atom.

Another π-electron compound is exemplified by, for example, an organic compound having a structure represented by the general formula (3) as shown below.

General formula (3):

[Chemical formula 3]

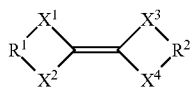

(3)

In the general formula (3), $X^1$ to $X^4$ are independently selected from a sulfur atom, an oxygen atom, a selenium atom, and a tellurium atom; $R^1$ to $R^2$ are independently selected from a chain aliphatic group and a cyclic aliphatic group; and the chain or cyclic aliphatic group can include at least one selected from the group consisting of an oxygen atom, a nitrogen atom, a sulfur atom, a silicon atom, a phosphorus atom, a boron atom, and a halogen atom.

The organic compounds represented by the foregoing general formulae (1) to (3) have a strong bonding force between molecules, namely, a strong intermolecular force. An active material with strong intermolecular force is readily formed into an active material being crystalline through refinement and recrystallization.

Preferably, the molecular structure of the organic compound with strong intermolecular force is a planar structure, and the conjugated π-electron cloud is present in the direction vertical to the plane of the planar structure. The planes in these organic compounds are superimposed on one another, and a strong intermolecular force is exerted by the conjugated π-electron cloud present in the direction vertical to the planes, allowing the organic compound serving as the active material to be crystalline. Further, for the formation of crystals, the organic compound preferably has a symmetric molecular structure.

Among the foregoing organic compounds, compounds represented by the formulae (4) to (26) as described below are preferred in view of their particularly strong intermolecular forces.

Here, the planar structure of the molecule of the organic compound is described with reference to the drawings. FIG. 2 is an example of a molecule of the organic compound having a planar structure, and FIGS. 3 to 5 are examples of a molecule of the organic compound having a multi-planar structure, each of which is a figure viewed in parallel to the molecular plane. The planar structure as herein referred to is not limited to the case where one molecule is present on the same plane as shown in FIG. 2. Alternatively, for example, the molecule may have two or more planar portions. For example, as shown in FIG. 3, the molecule of the organic compound may have a structure including two planar portions and a bent; as shown in FIG. 4, the molecule of the organic compound may have a structure including two planar portions present on the same plane, the two planar portions being arranged in the form of steps; and as shown in FIG. 5, the molecule of the organic compound may have a structure including three planar portions present on the same plane, the three planar portions being arranged in the form of steps.

Examples of the compounds represented by the general formula (1) include, for example, a compound represented by the chemical formula (4) and a compound represented by the general formula (5) as shown below.

Chemical formula (4):

[Chemical formula 4]

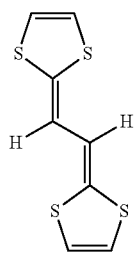

(4)

General formula (5):

[Chemical formula 5]

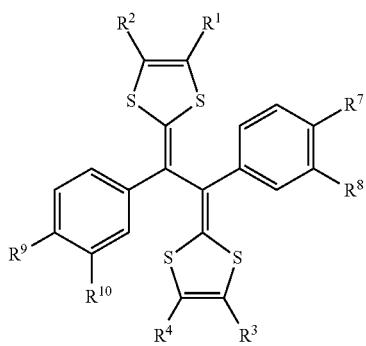

(5)

In the general formula (5), $R^1$ to $R^4$ and $R^7$ to $R^{10}$ are independently selected from a hydrogen atom, a chain aliphatic group, a cyclic aliphatic group, a hydroxyl group, a cyano group, an amino group, a nitro group, and a nitroso group; and the chain or cyclic aliphatic group can include at least one selected from the group consisting of an oxygen atom, a nitrogen atom, a sulfur atom, a silicon atom, a phosphorus atom, a boron atom, and a halogen atom.

In view of providing a high-voltage power storage device excellent in charge-discharge cycle characteristics, $R^1$ to $R^4$ and $R^7$ to $R^{10}$ in the general formulae (1), (2), and (5) are preferably a nitro group ($NO_2$). Further, in view of providing a high-voltage and high-capacity power storage device, $R^1$ to $R^4$ and $R^7$ to $R^{10}$ are preferably a cyano group (CN); and in view of providing a high-voltage and high-capacity power storage device having excellent rate characteristics and cycle characteristics, $R^1$ to $R^4$ and $R^7$ to $R^{10}$ are preferably a methyl group ($CH_3$).

Examples of the aliphatic group used as $R^1$ to $R^4$ and $R^7$ to $R^{10}$ include, for example, an alkyl group, a cycloalkyl group, an alkoxy group, a hydroxyalkyl group, a thioalkyl group, an aldehyde group, a carboxylic acid group, an alkyl halide group. The number of carbon atoms in the aliphatic group is preferably 1 to 6, although not limited thereto.

The compound represented by the chemical formula (4) has the smallest molecular weight in the compounds represented by the general formula (1), and therefore can serve as an active material having the highest energy density, making it possible to provide a power storage device having a high energy density. Moreover, the reaction proceeds quickly.

In the oxidation-reduction reaction of the compounds represented by the general formula (1), electrons are transferred on two five-membered rings, and two-step reaction occurs. The oxidation-reduction reaction of the compounds represented by the general formula (5), although similar to the reaction of the compounds represented by the general formula (1), because of the presence of two benzene rings located between two five-membered rings, the levels of energy associated with extraction of electrons from the two five-membered rings become close to each other, allowing the reaction to proceed in a quasi one-step manner. This is because the structure obtained by one-electron reaction and the structure obtained by two-electron reaction are very similar to each other. For this reason, in the compounds represented by the general formula (5), the reaction proceeds more quickly than in the case of the compounds represented by the general formula (1) where $R^5$ and $R^6$ do not include a benzene ring.

Typical examples of the compounds represented by the general formula (5) include compounds represented by the chemical formulae (6) to (9) as preferable compounds.

Chemical formula (6):

[Chemical formula 6]

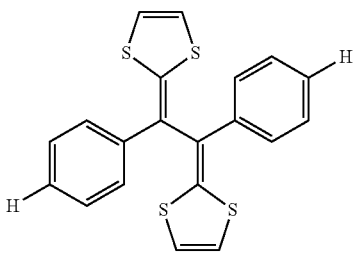

(6)

Chemical formula (7):

[Chemical formula 7]

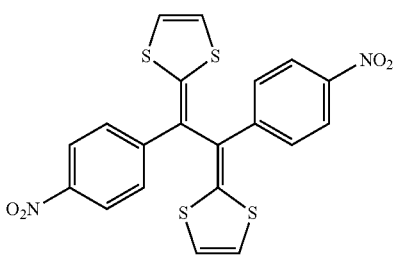

(7)

Chemical formula (8):

[Chemical formula 8]

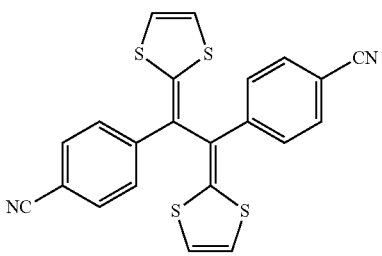

(8)

Chemical formula (9):

[Chemical formula 9]

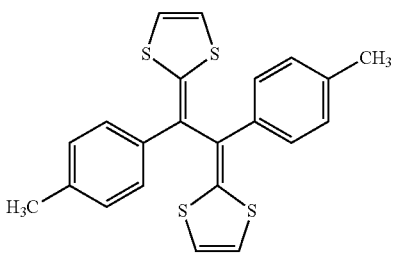

(9)

Examples of the compounds represented by the general formula (2) include, for example, a compound represented by the chemical formula (10) as shown below.

Chemical formula (10):

[Chemical formula 10]

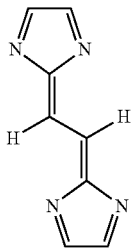

(10)

The compound represented by the chemical formula (10) has the smallest molecular weight in the compounds represented by the general formula (2), and therefore can serve as an active material having the highest energy density, making it possible to provide a power storage device having a high energy density. Moreover, the reaction proceeds quickly.

Examples of the compounds represented by the general formula (3) include, for example, compounds represented by the general formulae (11) to (14).

General formula (11):

[Chemical formula 11]

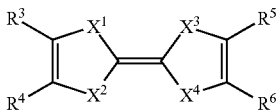

(11)

In the general formula (11), $X^1$ to $X^4$ are independently selected from a sulfur atom, an oxygen atom, a selenium atom, and a tellurium atom; $R^3$ to $R^6$ are independently selected from a hydrogen atom, a chain aliphatic group, a cyclic aliphatic group, a hydroxyl group, a cyano group, an amino group, a nitro group, and a nitroso group; and the chain or cyclic aliphatic group can include at least one selected from the group consisting of an oxygen atom, a nitrogen atom, a sulfur atom, a silicon atom, a phosphorus atom, a boron atom, and a halogen atom.

General formula (12):

[Chemical formula 12]

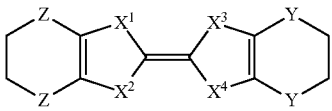

(12)

In the general formula (12), $X^1$ to $X^4$ are independently selected from a sulfur atom, an oxygen atom, a selenium atom, and a tellurium atom; and Y and Z are independently selected from a sulfur atom, an oxygen atom, a selenium atom, a tellurium atom, and a methylene group.

General formula (13):

[Chemical formula 13]

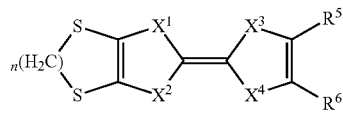

(13)

In the general formula (13), $X^1$ to $X^4$ are independently selected from a sulfur atom, an oxygen atom, a selenium atom, and a tellurium atom; $R^5$ and $R^6$ are independently selected from a hydrogen atom, a chain aliphatic group, a cyclic aliphatic group, a hydroxyl group, a cyano group, an amino group, a nitro group, and a nitroso group; the chain or cyclic aliphatic group can include at least one selected from the group consisting of an oxygen atom, a nitrogen atom, a sulfur atom, a silicon atom, a phosphorus atom, a boron atom, and a halogen atom; and n is 1 or more.

General formula (14):

[Chemical formula 14]

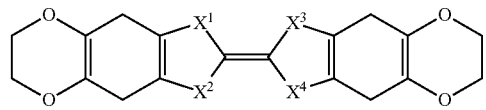

(14)

In the general formula (14), $X^1$ to $X^4$ are independently selected from a sulfur atom, an oxygen atom, a selenium atom, and a tellurium atom.

As the compounds represented by the general formula (3), for example, compounds represented by the formulae (15) to (26) are preferred. Among these, the compounds represented by the chemical formulae (16) and (20) are more preferred in view of their high energy densities.

Chemical formula (15):

[Chemical formula 15]

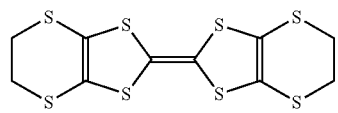

(15)

Chemical formula (16):

[Chemical formula 16]

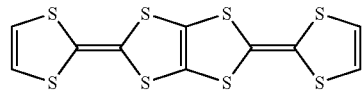

(16)

Chemical formula (17):

[Chemical formula 17]

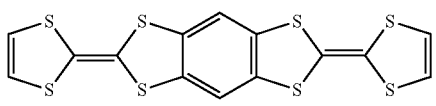
(17)

Chemical formula (18):

[Chemical formula 18]

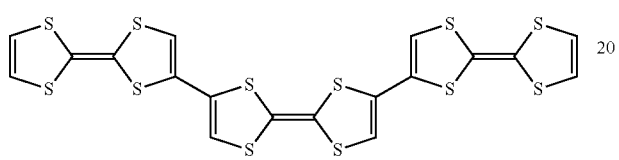
(18)

Chemical formula (19):

[Chemical formula 19]

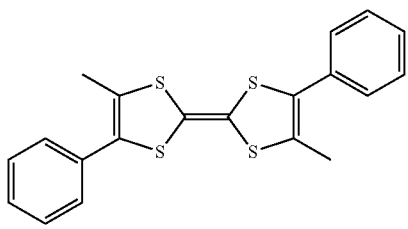
(19)

Chemical formula (20):

[Chemical formula 20]

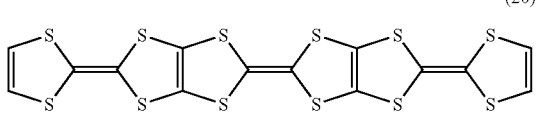
(20)

Chemical formula (21):

[Chemical formula 21]

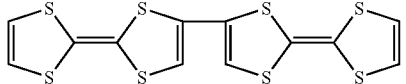
(21)

Chemical formula (22):

[Chemical formula 22]

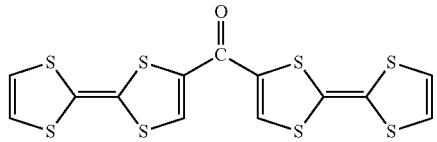
(22)

Chemical formula (23):

[Chemical formula 23]

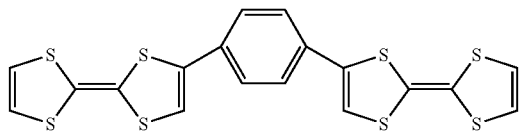
(23)

Chemical formula (24):

[Chemical formula 24]

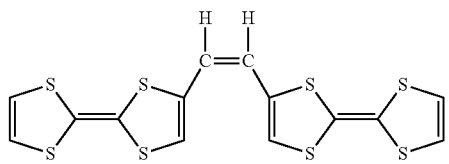
(24)

Chemical formula (25):

[Chemical formula 25]

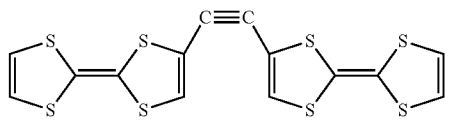
(25)

Chemical formula (26):

[Chemical formula 26]

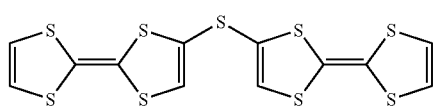
(26)

Examples of the radical compound include, for example, an organic compound having at least one selected from a nitroxy radical and an oxygen radical in its molecule, and specifically include nitroxy radicals, such as 2,2,6,6-tetramethylpiperidine-1-oxyl and 2,2,5,5-tetramethyl-3-imidazolium-1-loxy; and quinones, such as quinone and benzoquinone. The foregoing radical compounds readily become crystalline for the same reason as for the π-electron compound.

In the power storage device of the present invention, a crystal of the organic compounds as listed above is used. In order to obtain the crystal of the organic compound, it is effective to refine the organic compound to be recrystallized. Specifically, it is effective to dissolve the organic compound in a good solvent first, and then add a poor solvent thereto to cause reprecipitation. It is also effective to heat the organic compound close to a melting point, and then allow the organic compound to cool gradually.

If the organic compound is dissolved in a good solvent and then the solvent is evaporated, or alternatively if the organic compound is heated close to its melting point and then cooled rapidly, the organic compound becomes a low crystalline state or an amorphous state, which is not preferred as the organic compound for use in the power storage device of the present invention.

(B) Components of Electrolyte

For the electrolyte, for example, a non-aqueous electrolyte including an organic solvent and a supporting salt dissolved in the organic solvent is used. In the electrolyte, the supporting salt is present as ions, specifically, an anion and a cation.

In at least one of the charged state and the discharged state, it is preferable that the organic compound included in at least one of a positive electrode and a negative electrode is positively or negatively charged, and the positively or negatively charged organic compound forms a crystalline salt with an ion contained in the electrolyte, the ions having a polarity opposite to the polarity of the organic compound.

As the anion, it is possible to use a halide anion, a borofluoride anion, a perchlorate anion, a trifluoromethanesulfonate anion, a hexafluorophosphate anion, a trifluoromethanesulfonate anion, a nonafluoro-1-butanesulfonate anion, a bis(trifluoromethanesulfonyl)imide anion, a bis(perfluoroethylsulfonyl)imide anion, and the like.

For example, it is preferable that the anion preferably has a small ion radius and a three-dimensionally symmetric structure. The three-dimensionally symmetric structure means a point-symmetric structure.

When the anion enters the molecular crystal composed of the active material alone, the anion forms with the positively charge active material a new crystal. Presumably for this reason, if the anion has a large ion radius, the molecular crystal composed of the active material alone will be broken. In the case where the anion has a three-dimensionally non-symmetric structure with large variation in electric charge, it is difficult to form a new crystal having a three-dimensionally periodic structure, the new crystal being composed of the positively charged active material and the anion. In view of the above, among the anions as listed above, a halide anion, a perchlorate anion, a tetrafluoroborate anion, a hexafluorophosphate anion, and the like are preferred.

As the cation, for example, a cation of an alkali metal, such as lithium, sodium, and potassium; a cation of an alkaline earth metal, such as magnesium; or a cation of quarternary ammonium, such as tetraethylammonium and 1,3-ethylmethyl imidazolium is used.

As the solvent for the electrolyte, any material as applicable for a non-aqueous secondary battery or a non-aqueous electric double layer capacitor may be used without particular limitation. Specifically, organic solvents, such as ethylene carbonate, propylene carbonate, dimethyl carbonate, diethyl carbonate, methyl ethyl carbonate, γ-butyrolactone, tetrahydrofuran, dioxolane, sulfolane, dimethylformamide, and acetonitrile are used. These may be used alone or in combination of two or more.

As the organic solvent, it is desirable to use an organic solvent capable of maintaining the crystalline state of the active material and the salt composed of the positively charged active material and the anion, the organic solvent having a relative dielectric constant of 30 or less. If the relative dielectric constant exceeds 30, the force to dissociate the positively charged active material from the anion is increased, and therefore the active material in an oxidized state is allowed to readily dissolve in the electrolyte.

Here, the use of the π-electron compound such as bis(ethylenedithio)tetrathiafulvalene as represented by the general formula (3) is described. In charging, the π-electron compound is oxidized and the anion transferred from the non-aqueous electrolyte into the positive electrode is coordinated to the π-electron compound. Accordingly, the positively charged π-electron compound in a charged state is considered to form a salt with the anion. The electrostatic attraction force f to act between the anion and the cation is given in the following equation (b).

$$f = e^2 / \varepsilon_r d^2 \qquad (b)$$

where e represents a unit electric charge, $\varepsilon_r$ represents a relative dielectric constant of the organic solvent, and d represents an interionic distance. From the equation (b), when the relative dielectric constant of the organic solvent is increased, the attraction force between the anion and the cation is decreased, allowing the ions to readily dissociate from each other. For this reason, when an organic solvent having a large relative dielectric constant is used, the active material in a charged state and the anion are dissociated, allowing the positive electrode active material to readily dissolve in the electrolyte. This causes a capacity reduction in a repeated charge-discharge test.

The use of the π-electron compound such as bis(ethylenedithio)tetrathiafulvalene as the positive electrode active material, when the relative dielectric constant of the organic solvent is 30 or less, can inhibit the dissolution of the positive electrode active material in the course of charge-discharge reaction.

In addition, in the oxidation-reduction reaction of the π-electron compound, since the anion is involved in the reaction, the reaction resistance thereof is dependent on the concentration of the anion present in the electrolyte. The larger the concentration of the anion is, the smaller the reaction resistance is. The concentration of the anion is dependent on the concentration of the supporting salt in the electrolyte and the degree of dissociation. From the equation (b), when the relative dielectric constant of the organic solvent is increased, the interaction force (attraction force) between ions is decreased, causing the degree of dissociation to increase. Accordingly, an organic solvent having a higher relative dielectric constant allows the reaction resistance of the π-electron compound during oxidation and reduction to be reduced. The use of a supporting salt such as hexafluorophosphate lithium having a high degree of dissociation for the electrolyte, when the relative dielectric constant of the organic solvent is 10 or more, can reduce the reaction resistance. Therefore, when the relative dielectric constant of the organic solvent is 10 or more and 30 or less, since the reaction resistance is reduced, and the dissolution of the active material in association with the oxidation-reduction reaction is inhibited, it is possible to simultaneously achieve excellent charge-discharge cycle characteristics and high output power characteristics. The relative dielectric constant of the organic solvent as used herein means a relative dielectric constant of the organic solvent alone at 25° C., the value of which is easily available from known documents.

The foregoing organic solvent preferably comprises a first solvent having a relative dielectric constant of 10 or less and a second solvent having a relative dielectric constant of 30 or more.

Such mixing of a solvent with low dielectric constant and a solvent with high dielectric constant allows for easy adjustment of the relative specific constant of the organic solvent to 10 or more and 30 or less, making it possible to provide an intended level of characteristics in a simple and easy manner. The organic solvent having a relative dielectric constant of 10 or more and 30 or less by itself is exemplified by dimethylsulfoxide and the like. However, dimethylsulfoxide has a narrow potential window and dissolves the active material in an initial state and therefore is difficult to use in the power storage device of the present invention.

The first solvent is preferably at least one selected from the group consisting of chain carbonic acid esters, chain esters, and chain ethers. Examples of the first solvent include dimethyl carbonate, diethyl carbonate, ethyl methyl carbonate, methyl propionate, and dimethoxyethane.

The second solvent is preferably at least one selected from the group consisting of cyclic carbonic acid esters, cyclic esters, and cyclic ethers. Examples of the second solvent include ethylene carbonate, propylene carbonate, and γ-butyrolactone.

These organic solvents have a wide potential window and hardly dissolve the organic solvent having a conjugated π-electron cloud and therefore are suitably used as the organic solvent for the non-aqueous electrolyte.

Further, for an organic solvent that can be used, it is required that the active material in an initial state is insoluble to the organic solvent. This is because if an organic solvent in which the active material in an initial state demonstrates high solubility is used, the organic compound serving as the active material dissolves in the electrolyte during the storage of the power storage device, reducing the capacity and deteriorating the storage characteristics. Being insoluble as herein referred to means a solubility of the active material in the organic solvent of 0.01% by weight or less. Because of such a low solubility, the active material will not dissolve in the non-aqueous electrolyte during storage, and therefore, a highly reliable power storage device can be provided.

As the supporting salt, it is preferably to use a salt having an association constant of three of less, namely, a salt having a high degree of dissociation. The association constant as herein referred to means an association constant in propylene carbonate at 25° C., which is discussed in detail in documents and the like. (e.g., J. Electrochem. Soc., Vol. 141 (1994), No. 12, 3366).

The use of the supporting salt having a high degree of dissociation improves the ion concentration in the non-aqueous electrolyte, making it possible to reduce the reaction resistance. If the association constant of the supporting salt exceeds three, the dissociated ion concentration in the organic solvent having a relative dielectric constant within the forgoing range is lowered, resulting in a reduced electric conductivity.

As the salt having an association constant of three of less, lithium hexafluorophosphate ($LiPF_6$), lithium bis(trifluoromethylsulfonyl)imide (LiTFSI), and lithium bis(perfluoroethylsulfonyl)imide (LiBETI) are suitably used without any particular limitation. These supporting salts, which are widely and generally used as a supporting salt for lithium ion secondary batteries, demonstrate a high degree of dissociation even in a solvent with low dielectric constant and are excellent in chemical stability.

In addition, as an electrolyte other than the electrolyte as exemplified above, a polymer electrolyte or a solid electrolyte may be used. Examples of the solid electrolyte include, for example, $Li_2S$—$SiS_2$, $Li_2S$—$B_2S_5$, $Li_2S$—$P_2S_5$—$GeS_2$, sodium/alumina ($Al_2O_3$), a polyether being amorphous or having a low phase-transition temperature (Tg), an amorphous vinylidene fluoride-propylene hexafluoride copolymer, and a blend of different polymers polyethylene oxide.

(C) Number of Reaction Electrons n Per One Molecule of Active Material in Charge-discharge Reaction The larger the number of reaction electrons n per one molecule of the active material in charge-discharge reaction is, the higher the capacity of the power storage device to be obtained becomes. However, in order to maintain to be crystalline, a smaller number of reaction electrons n per one molecule of the active material is preferred. For example, in the case where during at least one of charging and discharging, the ion in the electrolyte enter the crystal of the organic compound serving as the active material to form a salt composed of the organic compound and the ion, when the number of reaction electrons n is small, the amount of ion to enter the inside of the crystal of the organic compound is decreased, and therefore the forgoing salt is more likely to maintain to be crystalline. Conversely, when the number of reaction electrons n is large, the amount of ion to enter the inside of the crystal of the organic compound is increased, and therefore the crystallinity of the forgoing salt is less likely to be maintained.

Based on the foregoing, in the power storage device, in order to maintain that the organic compound is crystalline during charging and discharging, there is a threshold with regard to the number of reaction electrons n. This threshold is dependent, for example, on the type of the organic compound or the component of the electrolyte.

When the number of reaction electron n is equal to or less than the threshold, the organic compound maintains to be crystalline during charging and discharging, and therefore a power storage device excellent in charge-discharge cycle characteristics can be provided. If the number of the reaction electron n exceeds the threshold, the organic compound cannot maintain to be crystalline during charging and discharging, deteriorating the charge-discharge cycle characteristics. For this reason, in order to simultaneously achieve both a high capacity and excellent charge-discharge cycle characteristics, the power storage device of the present invention is subjected to charging and discharging in a region in which the number of reaction electrons n is equal to or less than a threshold, the threshold being a value up to which the organic compound maintains to be crystalline. In view of the active material utilization rate (discharge capacity), the number of reaction electrons n is preferably as large as possible.

The number of reaction electron n can be easily controlled, for example, depending on the charge-discharge conditions, such as the charge upper limit voltage, the discharge lower limit voltage, the amount of charged electricity or the amount of discharged electricity; and the design of the power storage device, such as the balance between a positive electrode capacity and a negative electrode capacity (e.g., the ratio of a negative electrode capacity to a positive electrode capacity).

The reaction mechanism in the positive electrode when bis(ethylenedithio)tetrathiafulvalene is used for the positive electrode active material and lithium tetrafluoroborate is used for the supporting salt in the electrolyte is described below. The reaction represented by the following formula (c) is considered to proceed in the positive electrode.

　　　　　(c)

In the formula (c), ET represents bis(ethylenedithio)tetrathiafulvalene serving as the positive electrode active material. The rightward arrow in the formula (c) represents the direction of charge reaction. Accordingly, the active material in a discharged state is represented by ET, and the active material in a charged state is represented by $[ET^{n+} \cdot nBF_4^-]$. Further, n in the formula (c) represents the number of reaction electrons per one molecule of the active material.

The number of reaction electrons can be controlled, for example, depending on the amount of charged electricity and the amount of discharged electricity of the power storage device.

As shown in the formula (c), in charging, the active material is oxidized and positively charged, to be in a state where the anion in the electrolyte (here, tetrafluoroborate ion ($BF_4^-$)) is coordinated to an oxidized form of the active material, specifically, to be $[ET^{n+} \cdot nBF_4^-]$. In discharging, conversely, the oxidized form of the positively charged active material is reduced to lose the electric charge and release the anion, and thus returns to the pre-charging state, namely, the organic compound molecules.

The forgoing state of the active material during charging and discharging of the power storage device is described below. FIG. 6 shows a crystal structure of the active material during discharging, and FIG. 7 shows a crystal structure during charging.

As shown in FIG. 6, the active material during discharging is composed only of the molecular crystals of the organic compound (ET). In contrast, in the active martial during charging, as shown in FIG. 7, the anion ($BF_4^-$) enters the space between the molecules of the organic compound (ET), to form a salt composed of the positively charged active material and the anion as a crystal having a periodic structure. As described above, in the case where the organic compound serving as the active material has a crystalline structure during both charging and discharging, a power storage device with excellent charge-discharge cycle characteristics can be provided.

In the foregoing, a crystal composed only of the molecules of the organic compound containing no anion is formed in discharging. However, the crystal formed either in charging or in discharging may not a crystal of a simple substance of the organic compound containing no anion. In other words, both in charging and in discharging, a salt formed of the positively or negatively charged organic compound and the ion contained in the electrolyte having a polarity opposite to the polarity of the organic compound may be present as a crystal.

In the case of the foregoing configuration, the number of reaction electrons n per one molecule of the active material in charge-discharge reaction is two at the maximum. This means that per one molecule of the active material, reactions involving up to two electrons are possible. The larger this value is, the more electrons can be extracted per one molecule of the active material, and the more successfully a power storage device having a high capacity can be provided. However, in view of the charge-discharge cycle characteristics, in the case of the foregoing configuration, the number of reaction electrons n per one molecule of the active material in charge-discharge reaction is preferably 2.0 or less. Accordingly, when the number of reaction electrons n is 2.0 or less and is closest possible to 2.0, both a high capacity and excellent charge-discharge cycle characteristics can be achieved at the same time. The number of reaction electrons n can be easily controlled, for example, by appropriately setting the charge-discharge conditions, such as the charge upper limit voltage, the discharge lower limit voltage, the amount of charged electricity or the amount of discharged electricity; and the balance between a positive electrode capacity and a negative electrode capacity (e.g., the ratio of a negative electrode capacity to a positive electrode capacity).

Whether the active material under charging and discharging is crystalline or not, in other words, has a crystalline structure or not can be easily checked by X-ray diffractometry as described above. In the X-ray diffractometry, measurement may be performed with respect to an electrode plate including the active material. Alternatively, measurement may be performed with respect to an active material alone by extracting the active material only from the electrode plate. The results of the X-ray diffractometry of the active material under charging and discharging are shown in FIG. 8. The solid line in FIG. 8 shows a measurement result in a discharged state, and the dotted line shows a measurement result in a charged state. The presence of the diffraction peaks both in the measurement result of the active material under discharging and in the measurement result of the active material under charging indicates that the organic compound is crystalline. Further, the shift of the positions of the diffraction peak (X-ray incident angles) in the measurement result represented by the solid line from those in the measurement result represented by the dotted line indicates that the crystal structure during charging is changed from the crystal structure during discharging. A detailed analysis of the diffraction pattern provides detailed information about the crystal structure. The crystal structures during charging and discharging of the organic compound shown in FIGS. 6 and 7 are obtained by identifying the crystal structures on the basis of the information obtained from the X-ray diffraction patterns shown in FIG. 8.

A method of controlling the number of reaction electrons n per one molecule of the active material is exemplified by, for example, a method in which a power storage device including the foregoing organic compound as an active material in at least one of the positive electrode and the negative electrode is subjected to charging and discharging in a region where the active material utilization rate is equal to or less than a threshold, the threshold being a value up to which the organic compound maintains to be crystalline.

The active material utilization rate as used herein means a ratio of a capacity to be actually used in charge-discharge reaction to a theoretical capacity to be calculated on the basis of the weight of the active material included in the electrode. The theoretical capacity of the active material is determined from the number of reaction electrons (n) and the molecular weight (Mw) by the following equation (d). Here, the capacity means a current capacity.

Theoretical capacity $(mAh/g) = (n \times 96{,}500/Mw) \times (1{,}000/3{,}600)$　　　　　(d)

The threshold of the active material utilization rate is dependent on the type of the active material, the component of the electrolyte, and the like. By optimizing the type of the active material or the component of the electrolyte, charging and discharging can be performed in the region where the active material utilization rate is 90% or less.

For example, when a power storage device including the foregoing organic compound as the positive electrode active material is subjected to charging and discharging in such manner that the active material utilization rate is 90% or less, the active material can maintain to be crystalline during charging and discharging.

With the utilization rate of the positive electrode active material within the range above, it is possible to control the number of reaction electrons per one molecule of the active material to be equal to or less than a threshold. Even when an organic compound having a lower molecular weight of 10,000 or less is used as the active material, it is possible to inhibit the dissolving of the active material into the electrolyte. In particular, in the case of an organic compound having a molecular weight of 1000 or less which is readily dissolved into the electrolyte, the effect is notable.

As an exemplary method of controlling the charging and discharge as described above, description is given below about a case where tetrathiafulvalene as an example of the general formula (3) is used as the positive electrode active material. In charging, the tetrathiafulvalene used as the positive electrode active material is oxidized and the anion transferred from the electrolyte into the positive electrode is coordinated to the positive electrode active material. The reaction potential thereof is different depending on the utilization range of the active material. A reaction in which the valence changes from one to two occurs at a higher potential than a reaction in which the valence changes from zero to one. Depending on the charged state, the active material has a valence of zero, one or two, which determines the oxidation state of the active material. The oxidation state of the active material determines the solubility of the active material in the electrolyte. When the active material is in a divalent oxidation state, the solubility with respect to the electrolyte tends to increase.

FIG. 9 is a charge voltage curve obtained when tetrathiafulvalene is used as the positive electrode active material, and Li is used as the negative electrode active material. As shown in FIG. 9, the charge voltage curve has two-stepped flat portions. Other than this, depending on the type of the positive electrode active material, the charge voltage curve may have three or more stepped flat portions. Presumably, in the region in the low voltage side (region a in the figure), a reaction in which the valence changes from zero to one proceeds; and in the region in the high voltage side (region b in the figure), a reaction in which the valence changes from one to two proceeds.

The present inventors have found through various studies that the active material has a high solubility with respect to the electrolyte in the region where the active material is in a divalent oxidation state, tending to cause a reduction in capacity. The present inventors have further found that by performing charging and discharging as described above while restricting the utilization rate of the positive electrode active material to 90% or less, it is possible to restrict the ratio of the active material to be in a divalent oxidation state, that is, a state that allows the active material to be readily dissolved in the electrolyte, and thus to suppress the reduction in capacity. Moreover, another reduction in capacity due to a reason other than the dissolution of the active material in the electrolyte, that is, due to the deterioration of the positive electrode active material itself, such as the decomposition of the positive electrode active material itself, is observed. With respect to the reduction in capacity due to such a reason, limiting the utilization rate of the positive electrode active material as described above is effective in suppressing the reduction.

An exemplary method of controlling the utilization rate of the positive electrode active material to 90% or less in charging and discharging is, for example, a method in which in the power storage device including the foregoing organic compound as the positive electrode active material, the ratio of a negative electrode capacity to a positive electrode capacity is adjusted to 90% or less. When the ratio of a negative electrode capacity to a positive electrode capacity is 90% or less, the capacity of the power storage device is naturally regulated by the negative electrode capacity, allowing the active material utilization rate to be easily controlled within the foregoing range without using any special circuits or apparatuses. The positive electrode capacity and the negative electrode capacity as used herein refer to theoretical capacities of the positive electrode and the negative electrode.

Further, the method of controlling the utilization rate of the positive electrode active material is exemplified by a method in which in the charging of the power storage device including the foregoing organic compound as the positive electrode active material, the upper limit voltage is set at a maximum reaction voltage or less.

In the case where an active material having a reaction mechanism of multi-electron reaction, such as the foregoing π-electron compound is used as the positive electrode active material, the charge curve and discharge curve have two or more stepped flat portions respectively. The maximum reaction voltage as used herein means a voltage in a flat portion appearing the highest voltage side in the charge voltage curve when the voltage curve in charging has two or more stepped flat portions. A difference between steps in two or more stepped flat portions in the charge voltage curve is utilized to set an upper limit voltage in charging, whereby the oxidation state of the active material can be controlled, and thus the utilization rate of the positive electrode active material can be easily controlled without using any special apparatus and circuits, so that the utilization rate is within a range where the active material can maintain to be crystalline.

For example, in the case where tetrathiafulvalene is used as the positive electrode active material, as described above, the charge voltage curve has two-stepped flat portions. In the low voltage region (region a in FIG. 9), a reaction in which the valence changes from zero to one proceeds; and in the high voltage region (region b in FIG. 9), a reaction in which the valence changes from one to two proceeds. In addition, the maximum reaction voltage in the charge voltage curve shown in FIG. 9 is approximately 3.7 V. Accordingly, for example, by setting an upper limit voltage at 3.5 V, that is, at a voltage around the deflection point between two flat portions, it is possible to restrict the oxidation state of the active material to a univalent state and therefore to suppress the reduction in capacity that occurs as charge-discharge cycles are repeated.

In controlling the utilization rate of the positive electrode active material, it is preferable to use an electrolyte being difficult to dissolve the positive electrode active material. Since the electrolyte is difficult to dissolve the active material, the charge-discharge cycle characteristics are improved.

The electrolyte being difficult to dissolve the positive electrode active material as used herein refers to an electrolyte that provides a charge-discharge efficiency of 90% or more when charging is performed to the amount corresponding to a 100% active material utilization rate.

As described above, the solubility of the organic compound with respect to the electrolyte is greatly dependent on its oxidation state. For example, in the case of using bis (ethylenedithio)tetrathiafulvalene as the active material, when in a zero-valent oxidation state, the active material is insoluble with respect to such electrolytes as widely used in lithium ion secondary batteries, such as propylene carbonate and ethylene carbonate; however, the solubility with respect to the electrolytes increases as the oxidation number changes from one to two.

In addition, the solubility in an oxidation state of the forgoing organic compound is greatly dependent on the type of the electrolyte to be used. Specifically, as described above, in the case of using the π-electron compound as the active material, the higher the dielectric constant of the organic solvent in the electrolyte is, the more the solubility during charge-discharge reaction increases; and the higher the degree of dissociation of the supporting salt used for the electrolyte is, the more the solubility during charge-discharge reaction increases.

For the reasons above, by optimizing the composition of the electrolyte based on the foregoing, even when the active material is in a bivalent oxidation state, it is possible to inhibit the active material from dissolving in the electrolyte; and further, by controlling the active material utilization rate to 90% or less, it is possible to improve the charge-discharge cycle characteristics.

An exemplary power storage device of the present invention is described below with reference to drawings. FIG. 10 is a longitudinal cross sectional diagram of a coin battery, which is as an example of the power storage device of the present invention.

As shown in FIG. 10, in a case 11, a power generating element comprising a positive electrode 19, a negative electrode 20, and a separator 14 interposed between the positive electrode 19 and the negative electrode 20 is housed. The positive electrode 19 comprises a positive electrode current collector 12, and a positive electrode material mixture layer 13 formed on the positive electrode current collector 12. The positive electrode material mixture layer 13 includes the foregoing organic compound, such as bis(ethylenedithio) tetrathiafulvalene. The negative electrode 20 comprises a negative electrode current collector 17 and a negative electrode material mixture layer 16 including a negative electrode active material formed on the negative electrode current collector 17. The power generating element includes an electrolyte.

On the negative electrode current collector 17, a sealing plate 15 is disposed. The opening end of the case 11 is crimped onto the periphery of the sealing plate 15 with a gasket 18 interposed therebetween, whereby the case 11 is hermetically sealed. The positive electrode material mixture layer 13 includes, for example, a positive electrode active material, a conductive material, and a binder. The conductive material is used for the purpose of improving electron conductivity. Examples of the conductive material include, for example, a carbon material, such as carbon black, graphite, and acetylene black; and a conductive polymer, such as polyaniline, polypyrrole, and polythiophene.

The binder is used for the purpose of improving the adhesion of the positive electrode active material. Examples of the binder include, for example, polyvinylidene fluoride, vinylidene fluoride-hexafluoropropylene copolymer, vinylidene fluoride-polytetrafluoroethylene, polyethylene, polyimide, polyacrylic acid, and the like.

For the positive electrode current collector 12, a material as used in conventional batteries, such as a metallic foil, a metal mesh, and a resin film including a conductive filler is used.

The negative electrode material mixture layer 16 includes, for example, the negative electrode active material, and the conductive material and the binder as used in the positive electrode.

As the negative electrode active material, an active material as used in lithium ion secondary batteries, for example, a carbon material such as graphite and an amorphous carbon, lithium metal, a lithium-containing composite nitride, a lithium-containing titanium oxide, a composite material of tin and carbon, a composite material of tin and another metal, silicone, a silicon oxide, and the like is used without any particular limitation. Alternatively, a carbon material with electric double layer capacity, such as activated carbon, is used.

For the negative electrode current collector 17, a material as used in conventional batteries, such as a metallic foil, a metal mesh, and a resin film including a conductive filler is used.

In addition to the above, a negative electrode comprising a metallic lithium sheet may be used for the negative electrode 20.

The power storage device of the present invention is not limited to a coin battery as described above. The organic compound capable of being oxidized and reduced may be used for the negative electrode active material, or alternatively the organic compound capable of being oxidized and reduced may be used for both the positive electrode active material and the negative electrode active material. The power storage device is exemplified by, in addition to the foregoing non-aqueous electrolyte secondary battery, a non-aqueous electric double layer capacitor and the like.

EXAMPLES

Although examples of the present invention are described below in detail, the present invention is not limited to these examples.

Example 1

The same coin battery as shown in FIG. 10 was fabricated as the power storage device of the present invention in the following procedures.

(1) Formation of Positive Electrode

For the positive electrode active material, bis(ethylenedithio)tetrathiafulvalene (available from Tokyo Chemical Industry Co., Ltd.) was used as the organic compound having a conjugated π-electron cloud. The positive electrode active material had been purified and recrystallized beforehand. The purification and recrystallization of the positive electrode active material was performed by dissolving 50 mg of the positive electrode active material in 20 ml of carbon disulfide serving as the solvent, adding 20 ml of hexane thereto, and allowing the resultant solution to stand in an environment at a temperature of 5° C. to cause reprecipitation.

30 mg of the positive electrode active material (powder of approximately 5 μm in average particle size) and 30 mg of acetylene black (powder of 35 μm in average particle size) were uniformly mixed, and 1 mg of N-methyl-2-pyrrolidone was added thereto to give a slurry. It should be noted that the positive electrode active material and acetylene black as described in the following were both in a powdery state similar to the above. To this slurry, 5 mg of polyvinylidene fluoride was added to give a positive electrode material mixture in the form of slurry. This positive electrode material mixture was applied onto the positive electrode current collector 12 made of an aluminum foil (thickness 400 μm), and dried under vacuum. Thereafter, the positive electrode current collector with the material mixture applied thereonto was cut into a disc of 13.5 mm in diameter by punching, to form the positive electrode 19 in which the positive electrode material mixture layer 13 (thickness 30 μm) including the positive electrode active material was formed on the positive electrode current collector 12. At this time, the weight of the positive electrode active material applied was 1.7 mg/cm² per unit area.

(2) Fabrication of Coin Battery

The positive electrode 19 was disposed on the inner face of the case 11, and then on the positive electrode material mixture layer 13, the separator 14 made of a 20-μm-thick porous polyethylene sheet was disposed. The electrolyte was injected into the positive electrode material mixture layer 13 and the separator 14. For the electrolyte, a mixed solvent of propylene carbonate and diethyl carbonate (volume ratio 1:5) containing 0.5 mol/L lithium tetrafluoroborate was used.

The negative electrode 20 was press-fitted to the inner face of the sealing plate 15, and then the gasket 18 was placed on the periphery of the sealing plate 15. For the negative electrode 20, the one formed by cutting a 400-μm-thick lithium metal plate into a disc of 13.5 mm by punching was used. The sealing plate 15 was arranged in the opening of the case 11 such that the negative electrode 20 was opposite to the positive electrode 12 with the separator 14 interposed therebetween. The opening end of the case 11 was crimped onto the periphery of the sealing plate 15 with the gasket 18 interposed therebetween by using a pressing machine, so that the opening of the case 11 was sealed by means of the sealing plate 15. In such a manner as described above, coin battery A was obtained.

Battery A was charged at a constant current of 0.3 mA until the closed circuit voltage reached 4.0 V, and then discharged at a constant current of 0.3 mA until the closed circuit voltage reached 3.0 V.

Example 2

As the electrolyte, a mixed solvent of propylene carbonate and diethyl carbonate (volume ratio 1:5) containing 0.5 mol/L lithium hexafluorophosphate was used. Except for this, Battery B was fabricated and charged and discharged in the same manner as in Example 1.

Example 3

As the electrolyte, a mixed solvent of propylene carbonate and diethyl carbonate (volume ratio 1:5) containing 0.5 mol/L lithium perchlorate was used. Except for this, Battery C was fabricated and charged and discharged in the same manner as in Example 1.

Comparative Example 1

A battery of Comparative Example 1 was fabricated so as to have the exact same structure as that in Example 1 except for the salt to be dissolved in the electrolyte. As the electrolyte, a mixed solvent of propylene carbonate and diethyl carbonate (volume ratio 1:5) containing 0.5 mol/L lithium trifluoromethanesulfonate was used. Except for this, Battery D was fabricated and charged and discharged in the same manner as in Example 1.

Comparative Example 2

As the electrolyte, a mixed solvent of propylene carbonate and diethyl carbonate (volume ratio 1:5) containing 0.5 mol/L lithium nonafluoro-1-butanesulfonate was used. Except for this, Battery E was fabricated and charged and discharged in the same manner as in Example 1.

[Evaluation]

With regard to the batteries of Examples 1 to 3 and Comparative Examples 1 to 2, the crystalline quality of the organic compounds during charging and discharging and the charge-discharge cycle characteristics of the batteries were evaluated in the manner as described below.

(1) Evaluation of Crystalline Quality of Organic Compounds During Charging and Discharging Each of the batteries under charging and discharging was disassembled and the positive electrode was taken out, to perform X-ray diffractometry on the positive electrode. In the X-ray diffractometry, Cu—Kα radiation was used as an incident X-ray, the scanning angle was within a range of 1 to 34 degrees (2θ) according to 2θ/θ method, and the scanning rate was 1 deg/min. The evaluation of the crystalline quality was performed by the confirmation of a diffraction curve (diffraction peak) derived from the crystal structure of the organic compound. The evaluation of the crystalline quality was performed with respect to two states: a discharged state (before charging) and a charged state (after charging).

(2) Evaluation of Charge-discharge Cycle Characteristics of Batteries

In the foregoing charging and discharging, the ratio of a discharge capacity to a charge capacity, namely, the charge-discharge efficiency (%) was determined.

Further, the discharge capacity (Q [Coulomb]) was divided by the number of moles (M [mol]) of the organic compound serving as the active material and the Faraday constant (96,500 [Coulomb/mol]), to calculate the number of reaction electrons n per one molecule of the active material from the following equation (e).

(Number of reaction electrons $n$)=(Discharge capacity $Q$ [Coulomb])/96,500/(Number of moles $M$ [μmol] of organic compound)　　　(e)

The results of the foregoing evaluations are summed up in Table 1.

TABLE 1

| | Electrolyte | | | Crystallinity of active material | | Charge-discharge efficiency (%) |
|---|---|---|---|---|---|---|
| | Anion of supporting salt | Solvent | Number of reaction electrons n | During discharging | During charging | |
| Example 1 | $BF_4^-$ | PC/DEC | 1.9 | With | With | 99.2 |
| Example 2 | $PF_6^-$ | (1/5) | 1.9 | With | With | 98.9 |
| Example 3 | $ClO_4^-$ | | 1.9 | With | With | 99.0 |
| Comparative Example 1 | $CF_3SO_3^-$ | | 1.8 | With | Without | 24.5 |

TABLE 1-continued

| | Electrolyte | | Number of reaction electrons n | Crystallinity of active material | | Charge-discharge efficiency (%) |
| --- | --- | --- | --- | --- | --- | --- |
| | Anion of supporting salt | Solvent | | During discharging | During charging | |
| Comparative Example 2 | $CF_3(CF_2)_3SO_3^-$ | | 1.9 | With | Without | 20.4 |

In batteries of Examples 1 to 3 in which the organic compound serving as the active material was crystalline during both charging and discharging, the charge-discharge efficiency was high, that is, the charge-discharge cycle characteristics were excellent. In contrast, in batteries of Comparative Examples 1 to 2 in which the organic compound serving as the active material was not crystalline, the charge-discharge efficiency was low, that is, the charge-discharge cycle characteristics were poor.

Further, from Table 1, it was found that the anion of the supporting salt in the electrolyte had an influence on maintaining to be crystalline during charging and discharging of the organic compound serving as the active material. Specifically, it was found that the anion having a small ion radius and a three-dimensionally symmetric structure, namely, the tetrafluoroborate anion, the hexafluorophosphate anion, and the perchlorate anion, effectively acted in maintaining to be crystalline during charging and discharging of the organic compound serving as the active material.

Example 4

As the electrolyte, a mixed solvent of propylene carbonate and diethyl carbonate (volume ratio 1:3) containing 0.5 mol/L lithium hexafluorophosphate was used. Except for this, Battery F was fabricated and charged and discharged in the same manner as in Example 2.

Example 5

As the electrolyte, a mixed solvent of propylene carbonate and diethyl carbonate (volume ratio 1:2) containing 0.5 mol/L lithium hexafluorophosphate was used. Except for this, Battery G was fabricated and charged and discharged in the same manner as in Example 2.

Comparative Example 3

As the electrolyte, a mixed solvent of propylene carbonate and diethyl carbonate (volume ratio 1:1) containing 0.5 mol/L lithium hexafluorophosphate was used. Except for this, Battery H was fabricated and charged and discharged in the same manner as in Example 2.

Comparative Example 4

As the electrolyte, propylene carbonate containing 0.5 mol/L lithium hexafluorophosphate was used. Except for this, Battery H' was fabricated and charged and discharged in the same manner as in Example 2.

With respect to the batteries of Examples 4 and 5 and Comparative Examples 3 and 4, the evaluation was performed in the same manner as described above. The evaluation results are shown in Table 2 together with the results of Example 2.

TABLE 2

| | Electrolyte | | | Crystallinity of active material | | Charge-discharge efficiency (%) |
| --- | --- | --- | --- | --- | --- | --- |
| | Anion of supporting salt | Volume ratio of solvent (PC/DEC) | Number of reaction electrons n | During discharging | During charging | |
| Example 4 | $PF_6^-$ | 1/3 | 1.9 | With | With | 92.3 |
| Example 5 | | 1/2 | 1.9 | With | With | 85.2 |
| Comparative Example 3 | | 1/1 | 1.9 | With | Without | 60.3 |
| Comparative Example 4 | | 1/0 | 2.0 | With | Without | 15.1 |
| Example 2 | | 1/5 | 1.9 | With | With | 98.9 |

From Table 2, it was found that in batteries of Examples 2, 4, and 5 in which the organic compound serving as the active material was crystalline during both charging and discharging, the charge-discharge efficiency was high, that is, the charge-discharge cycle characteristics were excellent.

Moreover, it was found that the physical properties of the solvent used for the electrolyte had an influence on the crystalline quality during charging and discharging of the organic compound serving as the active material. Specifically, the relative dielectric constants at 25° C. of the solvents used for the electrolytes in the batteries of Examples 2, 4 and 5 and Comparative Examples 3 and 4 were 10.7, 20.2, 25.7, 36.3, and 65.0, respectively. It was found that in the batteries of Examples 2, 4, and 5 in which the relative dielectric constants at 25° C. of the solvents were 30 or less, the molecule of the organic compound serving as the active material was effectively able to maintain to be crystalline, resulting in improvement in the charge-discharge efficiency, namely, the charge-discharge cycle characteristics.

Example 6

Battery D was charged at a constant current of 0.3 mA for 1000 seconds, and then discharged at a constant current of 0.3 mA until the closed circuit voltage reached 3.0 V. In other words, charging and discharging were performed, so that the number of reaction electrons n per one molecule of the active material was 0.4.

Comparative Example 5

Battery D was charged at a constant current of 0.3 mA for 2500 seconds, and then discharged at a constant current of 0.3 mA until the closed circuit voltage reached 3.0 V. In other words, charging and discharging were performed, so that the number of reaction electrons n per one molecule of the active material was 1.2.

Example 7

Battery E was charged at a constant current of 0.3 mA for 1000 seconds, and then discharged at a constant current of 0.3 mA until the closed circuit voltage reached 3.0 V. In other words, charging and discharging were performed, so that the number of reaction electrons n per one molecule of the active material was 0.4.

Comparative Example 6

Battery E was charged at a constant current of 0.3 mA for 2500 seconds, and then discharged at a constant current of 0.3 mA until the closed circuit voltage reached 3.0 V. In other words, charging and discharging were performed, so that the number of reaction electrons n per one molecule of the active material was 1.2.

Example 8

Battery A was charged at a constant current of 0.3 mA for 1000 seconds, and then discharged at a constant current of 0.3 mA until the closed circuit voltage reached 3.0 V. In other words, charging and discharging were performed, so that the number of reaction electrons n per one molecule of the active material was 0.4.

Example 9

Battery A was charged at a constant current of 0.3 mA for 2500 seconds, and then discharged at a constant current of 0.3 mA until the closed circuit voltage reached 3.0 V. In other words, charging and discharging were performed, so that the number of reaction electrons n per one molecule of the active material was 1.2.

Example 10

Battery H' was charged at a constant current of 0.3 mA for 1000 seconds, and then discharged at a constant current of 0.3 mA until the closed circuit voltage reached 3.0 V. In other words, charging and discharging were performed, so that the number of reaction electrons n per one molecule of the active material was 0.4.

Example 11

Battery H' was charged at a constant current of 0.3 mA for 2500 seconds, and then discharged at a constant current of 0.3 mA until the closed circuit voltage reached 3.0 V. In other words, charging and discharging were performed, so that the number of reaction electrons n per one molecule of the active material was 1.2.

With respect to the batteries of Examples 6 to 11 and Comparative Examples 5 and 6, the crystalline quality during charging and discharging of the organic compounds serving as the active material and the charge-discharge cycle characteristics of the batteries were evaluated in the same manner as described above. The evaluation results are shown in Table 3 together with the results of Comparative Examples 1, 2, and 4 and Example 1.

TABLE 3

|  | Electrolyte | | Number of reaction electrons n | Crystallinity of active material | | Charge-discharge efficiency (%) |
|---|---|---|---|---|---|---|
|  | Anion of supporting salt | Solvent |  | During discharging | During charging |  |
| Example 6 | $CF_3SO_3^-$ | PC/DEC (1/5) | 0.5 | With | With | 99.2 |
| Comparative Example 5 |  |  | 1.2 | With | Without | 36.5 |
| Comparative Example 1 |  |  | 1.8 | With | Without | 24.5 |
| Example 7 | $CF_3(CF_2)_3SO_3^-$ |  | 0.5 | With | With | 98.8 |
| Comparative Example 6 |  |  | 1.2 | With | Without | 36.0 |
| Comparative Example 2 |  |  | 1.9 | With | Without | 20.4 |
| Example 8 | $BF_4^-$ |  | 0.5 | With | With | 99.8 |
| Example 9 |  |  | 1.2 | With | With | 99.4 |
| Example 1 |  |  | 1.9 | With | With | 99.2 |
| Example 10 | $PF_6^-$ | PC | 0.5 | With | With | 99.7 |
| Example 11 |  |  | 1.2 | With | With | 98.3 |
| Comparative Example 4 |  |  | 2.0 | With | Without | 15.1 |

In batteries of Examples 1 and 6 to 11 in which the organic compound serving as the active material was crystalline during both charging and discharging, the charge-discharge efficiency was high, that is, the charge-discharge cycle characteristics were excellent.

Further, it was found that the number of reaction electrons n per one molecule of the active material had an influence on the crystalline quality during charging and discharging of the organic compound serving as the active material. Specifically, it was found that when the number of reaction electrons n was equal to or less than a predetermined threshold, the organic compound serving as the active material was effectively able to maintain to be crystalline during charging and discharging.

With respect to the number of reaction electrons n, it was found that in the case where the anion of the supporting salt in the electrolyte was a trifluoromethanesulfonate anion or a nonafluoro-1-butanesulfonate anion, and the solvent in the electrolyte was a mixed solvent of propylene carbonate and diethyl carbonate (volume ratio 1:5), when the number n was 0.5 or less, the charge and discharge cycle characteristics were effectively improved. Further, it was found that in the case where the anion of the supporting salt in the electrolyte was a tetrafluoroborate anion, and the solvent in the electrolyte was a mixed solvent of propylene carbonate and diethyl carbonate (volume ratio 1:5), when the number of reaction electrons n was 1.9 or less, the charge and discharge cycle characteristic were effectively improved. Furthermore, it was found that in the case where the anion of the supporting salt in the electrolyte was a hexafluorophosphate anion, and the solvent was propylene carbonate, when the number of reaction electrons n was 1.2 or less, the charge-discharge cycle characteristic were effectively improved.

Example 12

For the positive electrode active material, an organic compound represented by the foregoing chemical formula (20) was used as the organic compound having a conjugated π-electron cloud. The organic compound represented by the chemical formula (20) was prepared according to the method described in a non-patent document (Yohji Misaki et al., Mol. Cryst. Liq. Cryst., 1996, 284, P. 337 to 344). The positive electrode active material had been purified and recrystallized beforehand. The purification and recrystallization of the positive electrode active material was performed by dissolving 50 mg of the positive electrode active material in 20 ml of carbon disulfide serving as the solvent, adding 20 ml of hexane thereto, and allowing the resultant solution to stand at a temperature of 5° C. to cause reprecipitation.

Battery I was fabricated in the same manner as in Example 1 except that the positive electrode active material prepared in the manner as described above was used.

Battery I was charged at a constant current of 0.3 mA until the closed circuit voltage reached 3.7 V, and then discharged at a constant current of 0.3 mA until the closed circuit voltage reached 3.0 V.

Example 13

Battery I was charged at a constant current of 0.3 mA until the closed circuit voltage reached 4.0 V, and then discharged at a constant current of 0.3 mA until the closed circuit voltage reached 3.0 V.

Comparative Example 7

Battery I was charged at a constant current of 0.3 mA until the closed circuit voltage reached 4.3 V, and then discharged at a constant current of 0.3 mA until the closed circuit voltage reached 3.0 V.

Example 14

For the positive electrode active material, an organic compound represented by the chemical formula (16) was used as the organic compound having a conjugated π-electron cloud. The organic compound represented by the chemical formula (16) was prepared according to the method described in a non-patent document (Yohji Misaki et al., Chemistry Letters, 1993, P. 1337 to 1340). The positive electrode active material had been purified and recrystallized beforehand. The purification and recrystallization of the positive electrode active material was performed by dissolving 50 mg of the positive electrode active material in 20 ml of carbon disulfide serving as the solvent, adding 20 ml of hexane thereto, and allowing the resultant solution to stand at a temperature of 5° C. to cause reprecipitation.

Battery J was fabricated in the same manner as in Example 1 except that the positive electrode active material prepared in the manner as described above was used.

Battery J was charged at a constant current of 0.3 mA until the closed circuit voltage reached 3.3 V, and then discharged at a constant current of 0.3 mA until the closed circuit voltage reached 2.8 V.

Example 15

Battery J was charged at a constant current of 0.3 mA until the closed circuit voltage reached 3.8 V, and then discharged at a constant current of 0.3 mA until the closed circuit voltage reached 2.8 V.

Comparative Example 8

Battery J was charged at a constant current of 0.3 mA until the closed circuit voltage reached 4.2 V, and then discharged at a constant current of 0.3 mA until the closed circuit voltage reached 2.8 V.

Example 16

For the positive electrode active material, an organic compound represented by the chemical formula (27), which is one of the compounds represented by the general formula (3), was used as the organic compound having a conjugated π-electron cloud. The organic compound represented by the chemical formula (27) was prepared according to the method described in a non-patent document (T. Suzuki et al., J. Am. Chem. Soc., 1989, 111, P. 3108 to 3109).

[Chemical formula 27]

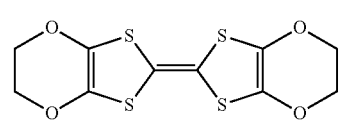

(27)

The positive electrode active material had been purified and recrystallized beforehand. The purification and recrystallization of the positive electrode active material was performed by dissolving 50 mg of the positive electrode active material in 20 ml of carbon disulfide serving as the solvent, adding 20 ml of hexane thereto, and allowing the resultant solution to stand in an environment at a temperature of 5° C. to cause reprecipitation.

Battery K was fabricated in the same manner as in Example 1 except that the positive electrode active material prepared in the manner as described above was used.

Battery K was charged at a constant current of 0.3 mA until the closed circuit voltage reached 3.65 V, and then discharged at a constant current of 0.3 mA until the closed circuit voltage reached 3.1 V.

Example 17

Battery K was charged at a constant current of 0.3 mA until the closed circuit voltage reached 3.8 V, and then discharged at a constant current of 0.3 mA until the closed circuit voltage reached 3.1 V.

Example 18

For the positive electrode active material, an organic compound represented by the chemical formula (28), which is one of the compounds represented by the general formula (3), was used as the organic compound having a conjugated π-electron cloud. The organic compound represented by the chemical formula (28) was prepared according to the method described in a non-patent document (Takeshi Senga, et al., Mol. Cryst. Lig. Cryst., 1997, 296, P. 97 to 143).

[Chemical formula 28]

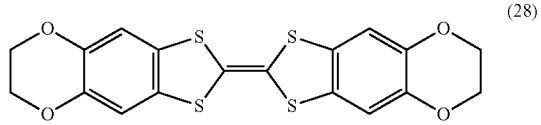

(28)

The positive electrode active material had been purified and recrystallized beforehand. The purification and recrystallization of the positive electrode active material was performed by dissolving 50 mg of the positive electrode active material in 20 ml of carbon disulfide serving as the solvent, adding 20 ml of hexane thereto, and allowing the resultant solution to stand in an environment at a temperature of 5° C. to cause reprecipitation.

Battery L was fabricated in the same manner as in Example 1 except that the positive electrode active material prepared in the manner as described above was used.

Battery L was charged at a constant current of 0.3 mA until the closed circuit voltage reached 3.65 V, and then discharged at a constant current of 0.3 mA until the closed circuit voltage reached 3.0 V.

Example 19

Battery L was charged at a constant current of 0.3 mA until the closed circuit voltage reached 4.1 V, and then discharged at a constant current of 0.3 mA until the closed circuit voltage reached 3.0 V.

With respect to the batteries of Examples 12 to 19 and Comparative Examples 7 and 8, the crystalline quality during charging and discharging of the organic compounds serving as the active material and the charge-discharge cycle characteristics of the batteries were evaluated in the same manner as described above. The evaluation results are shown in Table 4.

TABLE 4

| | Configuration of battery | | Evaluation of characteristics | | |
|---|---|---|---|---|---|
| | | | Crystallinity | | Charge- |
| | Active material | Number of reaction electrons n | During discharging | During charging | discharge efficiency (%) |
| Example 12 | Chemical formula (20) | 1.8 | With | With | 99.9 |
| Example 13 | | 3.7 | With | With | 99.8 |
| Comparative Example 7 | | 5.5 | With | Without | 79.0 |
| Example 14 | Chemical formula (16) | 1.3 | With | With | 99.8 |
| Example 15 | | 2.6 | With | With | 99.7 |
| Comparative Example 8 | | 4.0 | With | Without | 49.2 |
| Example 16 | Chemical formula (27) | 0.9 | With | With | 99.8 |
| Example 17 | | 1.8 | With | With | 99.6 |
| Example 18 | Chemical formula (28) | 0.9 | With | With | 99.8 |
| Example 19 | | 1.8 | With | With | 99.7 |

In the batteries of Examples 12 to 19 in which the organic compounds other than bis(ethylenedithio)-tetrathiafulvalene were used as the active material, the results similar to those in the batteries of Examples 1 to 11 in which bis(ethylenedithio)tetrathiafulvalene was used. Specifically, when the organic compound serving as the active material was crystalline during both charging and discharging, the charge-discharge efficiency was high, that is, the charge-discharge cycle characteristics were excellent. In contrast, in the batteries of Comparative Examples 7 and 8 in which the organic compound serving as the active material was not crystalline, the charge-discharge efficiency was low, that is, the charge-discharge cycle characteristics were poor.

Examples 20 to 31 and Comparative Examples 9 to 13

Test cells for evaluation were fabricated in the following procedures.
(1) Formation of Positive Electrode 30 mg of the positive electrode active material and 30 mg of acetylene black were uniformly mixed, and then 1 mg of N-methyl-pyrrolidone was added thereto, to give a slurry. For the positive electrode active material, bis(ethylenedithio)tetrathiafulvalene (available from Sigma-Ardrich Inc.) was used. To this slurry, 5 mg of polyvinylidene fluoride was added and mixed, to give a positive electrode material mixture. This positive electrode material mixture was applied onto a positive electrode current collector made of an aluminum foil, and dried under vacuum. Thereafter, the positive electrode current collector with the material mixture applied thereonto was cut into a size of 1 cm ×1 cm, to form a positive electrode in which a positive electrode material mixture layer including the positive electrode active material was formed on the positive electrode current collector. An aluminum lead was welded to the positive electrode. At this time, the amount of the positive electrode active material applied was 5 mg/cm² per unit area of the positive electrode.
(2) Preparation of Electrolyte Various kinds of electrolytes including solvents having different relative dielectric constants were prepared under the conditions as shown in Table 5. Here, in Table 5, PC, DEC, GBL, DME, and MP denote propylene carbonate, diethyl carbonate, gamma butyrolactone, dimethyl ether, and methyl propionate, respectively.

The relative dielectric constant of a mixed solvent can be determined by a linear approximation with respect to the mole fraction of each organic solvent in the mixed solvent. Therefore, the relative dielectric constants of the mixed solvents were calculated from the mole fraction and the relative dielectric constant of each organic solvent. The concentration of the supporting salt in the electrolyte was 0.5 mol/L.

(3) Formation of Test Cell

The positive electrode and the electrolyte obtained in the manner as described above were used, and lithium metal was used for a counter electrode and a reference electrode. These electrodes were immersed in 10 cm$^3$ of the electrolyte to form a test cell. Here, the size of the reference electrode was 5 mm×5 mm, and the size of the counter electrode was 15 mm×15 mm. The electrodes were stored under vacuum while immersed in the electrolyte in a polypropylene container, so that the pores in the positive electrode were impregnated with the electrolyte.

[Evaluation of Test Cell]

(4) Measurement of Reaction Resistance

The reaction resistance was determined according to an AC impedance measuring method with the use of Solartron. The AC impedance measurement was performed under the condition that the amplitude was 10 mV versus open-circuit voltage (OCV), and the frequency range was from 1 GHz to 0.1 Hz. The OCV of the test cell in this measurement was approximately 3.2 V.

(5) Evaluation of Solubility of Positive Electrode Active Material in Electrolyte With regard to the solubility of the positive electrode active material in the electrolyte was evaluated by performing a charge-discharge test using the test cell, on the basis of the charge-discharge efficiency determined from the following equation (f).

Charge-discharge efficiency (%)=(Discharge capacity)/(Charge capacity)×100　　(f)

The solubility of the active material in the electrolyte can be evaluated from the charge-discharge efficiency because the primary reason why the discharge capacity becomes smaller than the charge capacity is the dissolution of the active material in the electrolyte during charging. The charge-discharge test was performed under the condition that the charge current value and the discharge current value was 0.048 mA, the charge upper limit voltage was 4.2 V, and the discharge lower limit voltage was 3.0 V.

In addition, the presence of the crystallinity in the positive electrode active material during charging and discharging was checked in the same manner as described above.

The results of the evaluation above are shown in Table 5.

TABLE 5

| | Electrolyte | | | Evaluation of characteristics | |
|---|---|---|---|---|---|
| | Type of organic solvent | Mixing volume ratio of organic solvent | Supporting salt | Relative dielectric constant of organic solvent(s) | Reaction resistance ($\Omega \cdot cm^2$) | Charge-discharge efficiency (%) |
| Example 20 | PC/DEC | 1/2 | LiPF$_6$ | 25.7 | 5.5 | 85.2 |
| Example 21 | PC/DEC | 1/3 | LiPF$_6$ | 20.2 | 4.3 | 92.3 |
| Example 22 | PC/DEC | 1/4 | LiPF$_6$ | 16.9 | 4.5 | 95.3 |
| Example 23 | PC/DEC | 1/5 | LiPF$_6$ | 14.9 | 5.8 | 98.9 |
| Example 24 | PC/DEC | 1/8 | LiPF$_6$ | 10.7 | 7.6 | 99.7 |
| Example 25 | PC/DEC | 1/2 | LiTFSI | 25.7 | 4.9 | 90.2 |
| Example 26 | PC/DEC | 1/5 | LiTFSI | 14.9 | 5.4 | 99.3 |
| Example 27 | PC/DEC | 1/2 | LiBETI | 25.7 | 5.2 | 83.2 |
| Example 28 | PC/DEC | 1/5 | LiBETI | 14.9 | 5.8 | 95.3 |
| Comparative Example 9 | PC | — | LiPF$_6$ | 65 | 3.8 | 15.1 |
| Example 29 | DEC | — | LiPF$_6$ | 2.8 | 25.8 | 100 |
| Comparative Example 10 | GBL | — | LiPF$_6$ | 42 | 4.3 | 31.2 |
| Example 30 | DME | — | LiPF$_6$ | 7.2 | 8.3 | 85.2 |
| Example 31 | MP | — | LiPF$_6$ | 6.2 | 15.6 | 99.8 |
| Comparative Example 11 | PC/DEC | 1/1 | LiPF$_6$ | 36.3 | 4.3 | 60.3 |
| Comparative Example 12 | PC | — | LiTFSI | 65 | 2.8 | 26.3 |
| Comparative Example 13 | PC | — | LiBETI | 65 | 3.2 | 18.6 |

In the test cells of Examples 20 to 31 in which the relative dielectric constants of the organic solvents used for the electrolyte were 30 or les, the positive electrode active material was crystalline during charging and discharging, and the charge-discharge efficiency was high. In Examples 29 to 31 in which the relative dielectric constants of the organic solvents were 10 or less, the charge-discharge efficiency was high, but the reaction resistance was increased, reducing the output power characteristics.

In contrast, in the test cells of Comparative Examples 9 to 13 in which the relative dielectric constants of the organic solvents exceeded 30, although the reaction resistance was small, the positive electrode active material was not crystalline during charging, and the charge-discharge efficiency was reduced.

In view of the results in the test cells in Examples 20 to 28 that the charge-discharge efficiency was high and the reaction resistance was low, that is, the charge-discharge cycle characteristics were excellent and the output power characteristics were high, it was found that the relative dielectric constant of the organic solvent was preferably 10 to 30.

FIGS. 11 and 12 show a relationship between the reaction resistance and the relative dielectric constant of the organic solvent, and a relationship between the charge-discharge efficiency and the relative dielectric constant of the organic solvent, respectively. FIG. 11 indicates that the higher the relative dielectric constant of the organic solvent was, the smaller the reaction resistance was; and when the relative dielectric constant exceeded approximately 10, the reaction resistance became approximately 5 Ω/cm². FIG. 12 indicates that the higher the relative dielectric constant of the organic solvent was, the lower the charge-discharge efficiency was; but until the relative dielectric constant reached up to approximately 30, the charge-discharge efficiency was as high as 80% or more.

It should be noted that in these Examples, the amount of active material dissolved is larger than that in the case of a power storage device in actual use because a large amount of electrolyte was used for a clear evaluation of the effect in which the dissolution of the active material is inhibited.

Examples 32

In order to evaluate the charge-discharge cycle characteristics of the power storage device of the present invention, the same coin battery as shown in FIG. 10 was fabricated in the following procedures.
(1) Formation of Positive Electrode 30 mg of the positive electrode active material and 30 mg of acetylene black were uniformly mixed, and then 1 mg of N-methyl-2-pyrrolidone was added thereto, to give a slurry. For the positive electrode active material, bis(ethylenedithio)tetrathiafulvalene (available from Sigma-Ardrich Inc.) was used. To this slurry, 5 mg of polyvinylidene fluoride was added and mixed, to give a positive electrode material mixture. This positive electrode material mixture was applied onto the positive electrode current collector 12 made of an aluminum foil, and dried under vacuum. Thereafter, the positive electrode current collector with the material mixture applied thereonto was cut into a disc of 1.3 cm in diameter by punching, to form the positive electrode 19 in which the positive electrode material mixture layer 13 including the positive electrode active material was formed on the positive electrode current collector 12. At this time, the amount of the positive electrode active material applied was 5 mg/cm² per unit area of the positive electrode.
(2) Fabrication of Coin Battery The positive electrode 19 was disposed on the inner face of the case 11, and then on the positive electrode material mixture layer 13, the separator 14 made of a 20-μm-thick porous polyethylene sheet was disposed. The electrolyte was injected into the positive electrode material mixture layer 13 and the separator 14. For the electrolyte, the one prepared by dissolving LiPF$_6$ at a concentration of 1.0 M in a mixed solvent of PC and DEC (relative dielectric constant: 14.9, and volume ratio: PC/DEC=1/5) was used.

The negative electrode 20 was press-fitted to the inner face of the sealing plate 15, and then the gasket 18 was placed on the periphery of the sealing plate 15. For the negative electrode 20, the one formed by cutting a 400-μm-thick lithium metal plate into a disc of 1.5 cm by punching was used. The sealing plate 15 was arranged in the opening of the case 11 such that the negative electrode 20 was opposite to the positive electrode 12 with the separator 14 interposed therebetween. The opening end of the case 11 was crimped onto the periphery of the sealing plate 15 with the gasket 18 interposed therebetween by using a pressing machine, so that the opening of the case 11 was sealed by means of the sealing plate 15. In such a manner as described above, a coin battery was produced.

Example 33

A battery was fabricated in the same manner as in Example 32 except that an electrolyte prepared by dissolving LiPF$_6$ at a concentration of 1.0 mol/L in a mixed solvent of PC and DEC (relative dielectric constant: 10.7, and volume ratio: PC/DEC=1/8) was used in place of the electrolyte of Example 32.

Comparative Example 14

A battery was fabricated in the same manner as in Example 32 except that an electrolyte prepared by dissolving LiPF$_6$ at a concentration of 1.0 mol/L in PC (relative dielectric constant: 65) was used in place of the electrolyte of Example 32.
[Evaluation of Charge-discharge Cycle Characteristics]

The coin batteries of Example 32, Example 33, and Comparative Example 14 were used to perform a charge-discharge cycle test. The charge-discharge conditions were that the charge current value and the discharging current value were 0.24 mA, the charge upper limit voltage was 4.0 V, and the discharge lower limit voltage was 3.0 V. Charging and discharging were repeated alternately. The capacity retention rates at the 10th, 50th, 100th, 300th, and 500th cycle were determined. The capacity retention rate can be determined from the equation: Capacity retention rate (%)= (Initial charge capacity)/(Discharge capacity at each of the predetermined number of cycles)×100. The evaluation results are shown in Table 6.

TABLE 6

| | Capacity retention rate (%) | | | | |
|---|---|---|---|---|---|
| | 10th cycle | 50th cycle | 100th cycle | 300th cycle | 500th cycle |
| Example 32 | 100 | 97 | 95 | 88 | 82 |
| Example 33 | 100 | 98 | 95 | 92 | 86 |
| Comparative Example 14 | 10 | 3 | — | — | — |

In the battery of Comparative Example 14 in which only PC with high relative dielectric constant was used for the organic solvent, the capacity retention rate was significantly reduced because a large amount of the active material was dissolved. In contrast, in the batteries of Examples 32 and 33 of the present invention in which the relative dielectric constants of the organic solvents were 30 or less, the capacity retention rate was high, indicating that the charge-discharge cycle characteristics were significantly improved.

Example 34

The same coin battery as shown in FIG. 10 was fabricated in the following procedures.
(1) Formation of Positive Electrode 30 mg of the positive electrode active material and 30 mg of acetylene black were uniformly mixed, and then 100 mg of N-methyl-2-pyrrolidone was added thereto, to give a slurry. For the positive electrode active material, bis(ethylenedithio)tetrathiafulvalene (available from Sigma-Aldrich Inc.) was used as the organic compound having a conjugated π-electron cloud. To this slurry, 5 mg of polyvinylidene fluoride was added and mixed, to give a positive electrode material mixture in the form of slurry. This positive electrode material mixture was applied onto the positive electrode current collector 12 made of an aluminum foil, and dried under vacuum. Thereafter, the positive electrode current collector with the material mixture applied thereonto was cut into a disc of 13.5 mm in diameter by punching, to form the positive electrode 19 in which the positive electrode material mixture layer 13 was formed on the positive electrode current collector 12. At this time, the weight of the positive electrode active material applied was 1.7 mg/cm$^2$ per unit area of the positive electrode.

(2) Formation of Negative Electrode 15 mg of powdery graphite serving as the negative electrode active material and 6 mg of acetylene black were uniformly mixed, and then 6 mg of polyvinylpyrrolidone and 250 mg of methanol were added thereto, to give a slurry. This slurry was cast onto the negative electrode current collector 17 made of an aluminum foil, and dried under vacuum. Thereafter, the negative electrode current collector with the slurry cast thereonto was cut into a disc of 14.5 mm in diameter by punching, to form the negative electrode 20 in which the negative electrode material mixture layer 16 including the negative electrode active material was formed on the negative electrode current collector 17.

(3) Fabrication of Coin Battery

The positive electrode 19 was disposed on the inner face of the case 11, and then on the positive electrode material mixture layer 13, the separator 14 made of a 20-μm-thick porous polyethylene sheet was disposed. Next, the electrolyte was injected into the positive electrode material mixture layer 13 and the separator 14. For the electrolyte, the one prepared by dissolving lithium fluoroborate at a concentration of 1 M in a mixed solvent containing ethylene carbonate (EC) and propylene carbonate (PC) at a volume ratio of 1:1 was used.

The negative electrode 20 was press-fitted to the inner face of the sealing plate 15, and then the gasket 18 was placed on the periphery of the sealing plate 15. The sealing plate 15 was arranged in the opening of the case 11 such that the negative electrode 20 was opposite to the positive electrode 12 with the separator 14 interposed therebetween. The opening end of the case 11 was crimped onto the periphery of the sealing plate 15 with the gasket 18 interposed therebetween by using a pressing machine, so that the opening of the case 11 was sealed by means of the sealing plate 15.

A charge-discharge test was performed with the use of the electrolyte as described above and a lithium counter electrode. As the result, the initial charge-discharge efficiency was 70%, indicating that the reduction in capacity during charge-discharge cycling due to the dissolution of the active material had a comparatively great influence. As described above, in this Example, an electrolyte in which a comparatively large reduction in capacity occurred in association with repeated charge-discharge cycles was selectively used for an easy evaluation of the effect obtained by regulating the capacity utilization rate.

Several negative electrodes 20 having different capacities were formed by controlling the thickness in the process of casting in the foregoing formation of a negative electrode such that the ratios of a negative electrode capacity to a positive electrode capacity were 30%, 50%, 70%, 90%, and 100%. The coin batteries including the negative electrodes in which the ratios of a negative electrode capacity to a positive electrode capacity were 30%, 50%, 70%, 90%, and 100% were referred to as Samples 1, 2, 3, 4, and 5, respectively.

Example 35

Batteries was fabricated in the same manner as in Example 34 except that an electrolyte prepared by dissolving lithium hexafluorophosphate at a concentration of 1 mol/L in a mixed solvent containing propylene carbonate (PC) and diethyl carbonate (DEC) at a weight ratio of 1:4 was used in place of the electrolyte of Example 34. Here, the initial charge-discharge efficiency in the case of using the foregoing electrolyte was 95%. The coin batteries including the negative electrodes in which the ratios of a negative electrode capacity to a positive electrode capacity were 30%, 50%, 70%, 90%, and 100% were referred to as Samples 6, 7, 8, 9, and 10, respectively.

A charge-discharge cycle test was performed with respect to each of the batteries fabricated in the manner as described above. The charge-discharge test conditions were that the charge and discharge current values were 1 mA, the charge upper limit voltage was 4.0 V, and the discharge lower limit voltage was 3 V. With respect to each battery, 500 cycles of charging and discharging were performed, and the capacity retention rates at the initial, 50th, 100th, 300th, and 500th cycle were determined in the same manner as described above. The evaluation results are shown in Table 7.

TABLE 7

| | Solvent in electrolyte | Negative electrode capacity/ positive electrode capacity × 100 (%) | Capacity retention rate (%) | | | |
|---|---|---|---|---|---|---|
| | | | 50th cycle | 100th cycle | 300th cycle | 500th cycle |
| Sample 1 | EC/PC | 30 | 99 | 98 | 94 | 90 |
| Sample 2 | | 50 | 93 | 88 | 68 | 49 |
| Sample 3 | | 70 | 50 | 30 | 5 | 5 |
| Sample 4 | | 90 | 30 | 8 | 5 | 5 |
| Sample 5 | | 100 | 20 | 5 | 4 | 4 |
| Sample 6 | PC/DEC | 30 | 99 | 98 | 95 | 90 |
| Sample 7 | | 50 | 98 | 97 | 93 | 89 |
| Sample 8 | | 70 | 97 | 95 | 90 | 85 |
| Sample 9 | | 90 | 97 | 94 | 88 | 80 |
| Sample 10 | | 100 | 93 | 89 | 83 | 72 |

From the comparison among the batteries of Samples 1 to 5 including an EC/PC based electrolyte, in the batteries of Samples 1 and 2 in which the utilization rate of the positive electrode active material was 50% or less, the active material maintained to be crystalline and the charge-discharge cycle characteristics were significantly improved; and in the batteries of Samples 3 to 5 in which the utilization rate of the positive electrode active material was 70% or more, since the active material was readily dissolved in the electrolyte, the charge-discharge cycle characteristics were reduced.

From the comparison among the batteries of Samples 6 to 10 including a PC/DEC based electrolyte, in the batteries of Samples 6 and 9 in which the utilization rate of the positive electrode active material was 90% or less, the active material maintained to be crystalline and the charge-discharge cycle characteristics were significantly improved; and in the battery of Sample 10 in which the utilization rate of the positive electrode active material was 100%, since the active material was readily dissolved in the electrolyte, the charge-discharge cycle characteristics were reduced.

Example 36

Batteries were fabricated in the same manner as in Example 34 except that lithium metal was used for the negative electrode 20 and a charge-discharge test was performed under the same conditions as those in the foregoing charge-discharge cycle test.

FIG. 13 shows a charge voltage curve obtained when bis(ethylenedithio)tetrathiafulvalene was used for the positive electrode active material and lithium metal was used for the negative electrode active material. Although it was predicted that the charge-discharge curve would have two-stepped flat portions since the two electrons was coordinated to the conjugated π-electron cloud of bis(ethylenedithio)tetrathiafulvalene, the charge-discharge curve obtained by the charge-discharge test had three-stepped flat portions. The reason why the charge-discharge curve has three-stepped flat portions is not clear, but, presumably, in the low voltage region a, a reaction in which the valence changes from zero to one proceeds; and in the high voltage region c, a reaction in which the valence changes from one to two proceeds. Further, presumably, in the middle voltage region b, both the reaction in which the valence changes from zero to one and the reaction in which the valence changes from one to two proceed.

In light of the result that the charge-discharge curve had three-stepped flat portions, in this Example, a charge-discharge reaction was allowed to proceed using each potential in the midpoint between two adjacent flat portions as an upper limit in charging. Specifically, the upper limit voltages in charging were set at 3.6 V and 3.8 V. These batteries were referred to as Samples 11 and 12. Further, the battery having been subjected to charge-discharge reaction with an upper limit voltage in charging set at 4.0 V, which exceeded the maximum reaction voltage, was referred to as Sample 13. Except for this, the charge-discharge cycle test was performed under the same conditions as in Example 1. The test results are shown in Table 8.

TABLE 8

| Upper limit voltage in charging (V) | Active material utilization rate in initial charging (%) | Capacity retention rate (%) | | | |
|---|---|---|---|---|---|
| | | 50th cycle | 100th cycle | 300th cycle | 500th cycle |
| Sample 11 | 3.6 | 30 | 100 | 98 | 95 | 91 |
| Sample 12 | 3.8 | 60 | 95 | 91 | 74 | 68 |
| Sample 13 | 4.0 | 100 | 18 | 4 | 3 | 3 |

From Table 8, it was found that in the case of using an active material that allowed charge-discharge reaction to proceed by multi-electron reaction, by controlling the upper limit voltage in charging, the active material utilization rate can be restricted. Moreover, it was found that in the batteries of Samples 11 and 12 in which the active material utilization rate was 60% or less, the active material maintained to be crystalline, the charge-discharge cycle characteristics was significantly improved, and the deterioration in capacity during charge-discharge cycling can be inhibited.

INDUSTRIAL APPLICABILITY

The power storage device of the present invention has a high power output, a high capacity, and excellent charge-discharge cycle characteristics, and therefore, is suitably used as a power supply for various portable devices, transportation equipment, and the like, and an uninterruptive power supply.

The invention claimed is:

1. A power storage device comprising a positive electrode, a negative electrode, and an electrolyte, wherein:
   at least one of said positive electrode and said negative electrode includes an organic compound as an active material having a portion contributing to an oxidation-reduction reaction,
   said organic compound is crystalline in both a charged state and a discharged state,
   said organic compound has conjugated π-electron cloud or a radical, and has a structure represented by general formula (3):

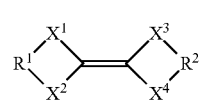

(3)

in the general formula (3), $X^1$ to $X^4$ are independently selected from a sulfur atom, an oxygen atom, a selenium atom, and a tellurium atom; $R^1$ to $R^2$ are independently selected from a chain aliphatic group and a cyclic aliphatic group; and the chain or cyclic aliphatic group can include at least one selected from the group consisting of an oxygen atom, a nitrogen atom, a sulfur atom, a silicon atom, a phosphorus atom, a boron atom, and a halogen atom,
   said electrolyte comprises an organic solvent and a supporting salt dissolved in said organic solvent,
   said organic solvent includes propylene carbonate, and
   said organic solvent has a relative dielectric constant of 10 or more and 30 or less.

2. The power storage device in accordance with claim 1, wherein said organic compound has a molecular weight of 10,000 or less.

3. The power storage device in accordance with claim 1, wherein the molecular structure of said organic compound is a planar structure, and said conjugated π-electron cloud is present in the direction vertical to the plane of said planar structure.

4. The power storage device in accordance with claim 1, wherein:
   said supporting salt includes an anion and a cation, and
   said anion has a three-dimensionally symmetric structure.

5. The power storage device in accordance with claim 4, wherein said anion includes at least one selected from the group consisting of a tetrafluoroborate anion, a hexafluorophosphate anion, and a perchlorate anion.

6. The power storage device in accordance with claim 1, wherein said supporting salt has an association constant of three of less.

7. The power storage device in accordance with claim 1, wherein said supporting salt is at least one selected from the group consisting of lithium hexafluorophosphate, lithium bis(trifluoromethylsulfonyl)imide and lithium bis(perfluoroethylsulfonyl)imide.

8. The power storage device in accordance with claim 1, wherein said organic solvent comprises a mixed solvent of a first solvent having a relative dielectric constant of 10 or less and a second solvent having a relative dielectric constant of 30 or more, and said second solvent includes the propylene carbonate.

9. The power storage device in accordance with claim 8, wherein
said first solvent is at least one selected from the group consisting of chain carbonic acid esters, chain esters, and chain ethers, and
said second solvent is at least one selected from the group consisting of cyclic carbonic acid esters, cyclic esters, and cyclic ethers.

10. The power storage device in accordance with claim 1, wherein the number of reaction electrons per one molecule of said organic compound during charging and discharging is 2.0 or less.

11. The power storage device in accordance with claim 1, wherein in at least one of the charged state and the discharged state, said organic compound included in at least one of said positive electrode and said negative electrode is positively or negatively charged, and said organic compound charged positively or negatively forms a crystalline salt with an ion contained in said electrolyte, the ion having a polarity opposite to the polarity of said organic compound.

12. The power storage device in accordance with claim 1, wherein said organic compound has a structure represented by general formula (20):

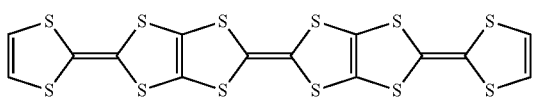
(20)

the number of reaction electrons per one molecule of said organic compound during charging and discharging is 1.8 to 3.7.

13. The power storage device in accordance with claim 1, wherein said organic compound has a structure represented by general formula (16):

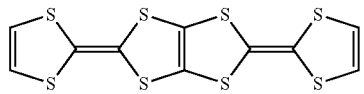
(16)

the number of reaction electrons per one molecule of said organic compound during charging and discharging is 1.3 to 2.6.

14. The power storage device in accordance with claim 1, wherein:
said supporting salt includes an anion and a cation, and
the number of reaction electrons per one molecule of said organic compound during charging and discharging is 2.0 or less, provided that the number of reaction electrons is 0.5 or less when said anion is $CF_3SO^{3-}$ or $CF_3(CF_2)_3SO^{3-}$, and the number of reaction electrons is 1.2 or less when said organic solvent is polypropylene carbonate.

15. The power storage device in accordance with claim 1, wherein the number of reaction electrons per one molecule of said organic compound during charging and discharging is 3.7 or less.

16. The power storage device in accordance with claim 1, wherein the number of reaction electrons per one molecule of said organic compound during charging and discharging is 2.6 or less.

17. The power storage device in accordance with claim 1, wherein the ratio of a capacity of the negative electrode to a capacity of the positive electrode is more than 30% and 90% or less.

18. The power storage device in accordance with claim 1, wherein the ratio of a capacity of the negative electrode to a capacity of the positive electrode is 50% or more and 90% or less.

* * * * *